(12) United States Patent
Choi et al.

(10) Patent No.: US 12,417,307 B2
(45) Date of Patent: Sep. 16, 2025

(54) ELECTRONIC DEVICE FOR PROTECTING PERSONAL INFORMATION AND OPERATION METHOD THEREOF

(71) Applicants: SAMSUNG ELECTRONICS CO., LTD., Suwon-si (KR); THE REGENTS OF THE UNIVERSITY OF MICHIGAN, Ann Arbor, MI (US)

(72) Inventors: Jongmin Choi, Suwon-si (KR); Hoang Duc Bui, Ann Arbor, MI (US); Kang Guen Shin, Ann Arbor, MI (US); Junbum Shin, Suwon-si (KR)

(73) Assignees: SAMSUNG ELECTRONICS CO., LTD., Suwon-si (KR); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 115 days.

(21) Appl. No.: 18/117,141

(22) Filed: Mar. 3, 2023

(65) Prior Publication Data

US 2023/0205924 A1 Jun. 29, 2023

Related U.S. Application Data

(63) Continuation of application No. PCT/KR2021/011759, filed on Sep. 1, 2021.

(30) Foreign Application Priority Data

Sep. 3, 2020 (KR) .................. 10-2020-0112549

(51) Int. Cl.
G06F 21/62 (2013.01)
H04W 12/02 (2009.01)

(52) U.S. Cl.
CPC ........ *G06F 21/6245* (2013.01); *H04W 12/02* (2013.01)

(58) Field of Classification Search
CPC ...... G06F 21/6245; G06F 21/62; G06F 40/20; H04W 12/02
See application file for complete search history.

(56) References Cited

U.S. PATENT DOCUMENTS

| 8,918,632 B1 | 12/2014 | Sartor |
| 9,137,739 B2 | 9/2015 | Raleigh |

(Continued)

FOREIGN PATENT DOCUMENTS

| JP | 6290035 | 3/2018 |
| JP | 7062581 | 5/2022 |

(Continued)

OTHER PUBLICATIONS

International Search Report for PCT/KR2021/011759, mailed Dec. 13, 2021, 4 pages.

*Primary Examiner* — Hany S. Gadalla
(74) *Attorney, Agent, or Firm* — Nixon & Vanderhye, P.C.

(57) ABSTRACT

An example electronic device for protecting personal information for protecting a user's personal information may include a communicator, an output unit, a memory storing one or more instructions, and a processor configured to execute the one or more instructions stored in the memory to obtain policy data indicating a user privacy policy related to a service provided by the electronic device, identify, from the obtained policy data, first personal information to be used to provide the service, identify, from an execution file of the application providing the service, second personal information configured to be used by the application, identify third personal information used by the application while the application is executed, compare the first personal information identified from the policy data, the second personal information identified from the execution file of the application, and the third personal information used by the (Continued)

application, and determine, based on a result of the comparing, an operation of the electronic device for protecting the user's personal information.

15 Claims, 14 Drawing Sheets

(56) References Cited

U.S. PATENT DOCUMENTS

| | | | |
|---|---|---|---|
| 9,721,105 B2 | 8/2017 | Biswas et al. | |
| 9,942,276 B2 | 4/2018 | Sartor | |
| 10,165,011 B2 | 12/2018 | Barday | |
| 10,348,775 B2 | 7/2019 | Barday | |
| 10,893,074 B2 | 1/2021 | Sartor | |
| 11,551,117 B1* | 1/2023 | Malhotra | G06Q 50/26 |
| 2008/0307529 A1 | 12/2008 | Choi et al. | |
| 2010/0281514 A1 | 11/2010 | Noh et al. | |
| 2011/0277037 A1* | 11/2011 | Burke | G06F 21/60 |
| | | | 726/26 |
| 2019/0034659 A1* | 1/2019 | Griffin | G06F 21/57 |
| 2020/0125766 A1 | 4/2020 | Yang | |
| 2021/0127035 A1 | 4/2021 | Kim | |
| 2022/0043938 A1* | 2/2022 | Kochura | G06F 21/84 |

FOREIGN PATENT DOCUMENTS

| | | |
|---|---|---|
| KR | 10-0670826 | 1/2007 |
| KR | 10-2007-0117756 | 12/2007 |
| KR | 10-2011-0055921 | 5/2011 |
| KR | 10-1086452 | 11/2017 |
| KR | 10-2020-0019059 | 2/2020 |
| KR | 10-2020-0020176 | 2/2020 |
| KR | 2280450 | 7/2021 |
| WO | 2014/028009 | 2/2014 |

* cited by examiner

FIG. 4
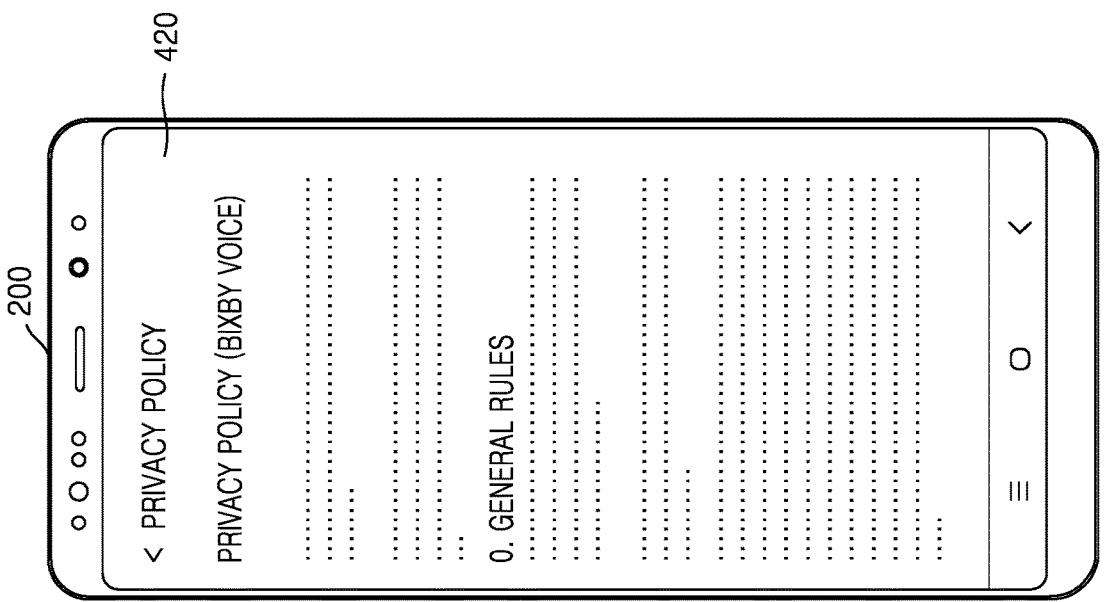
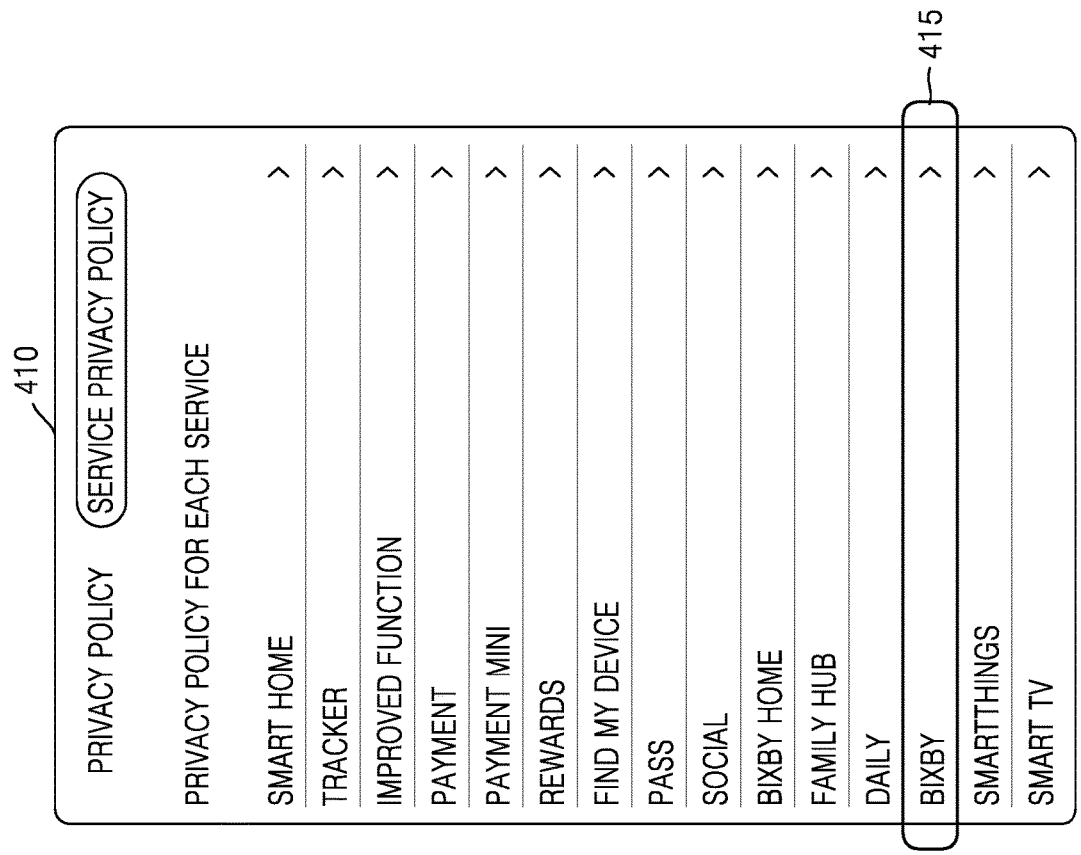

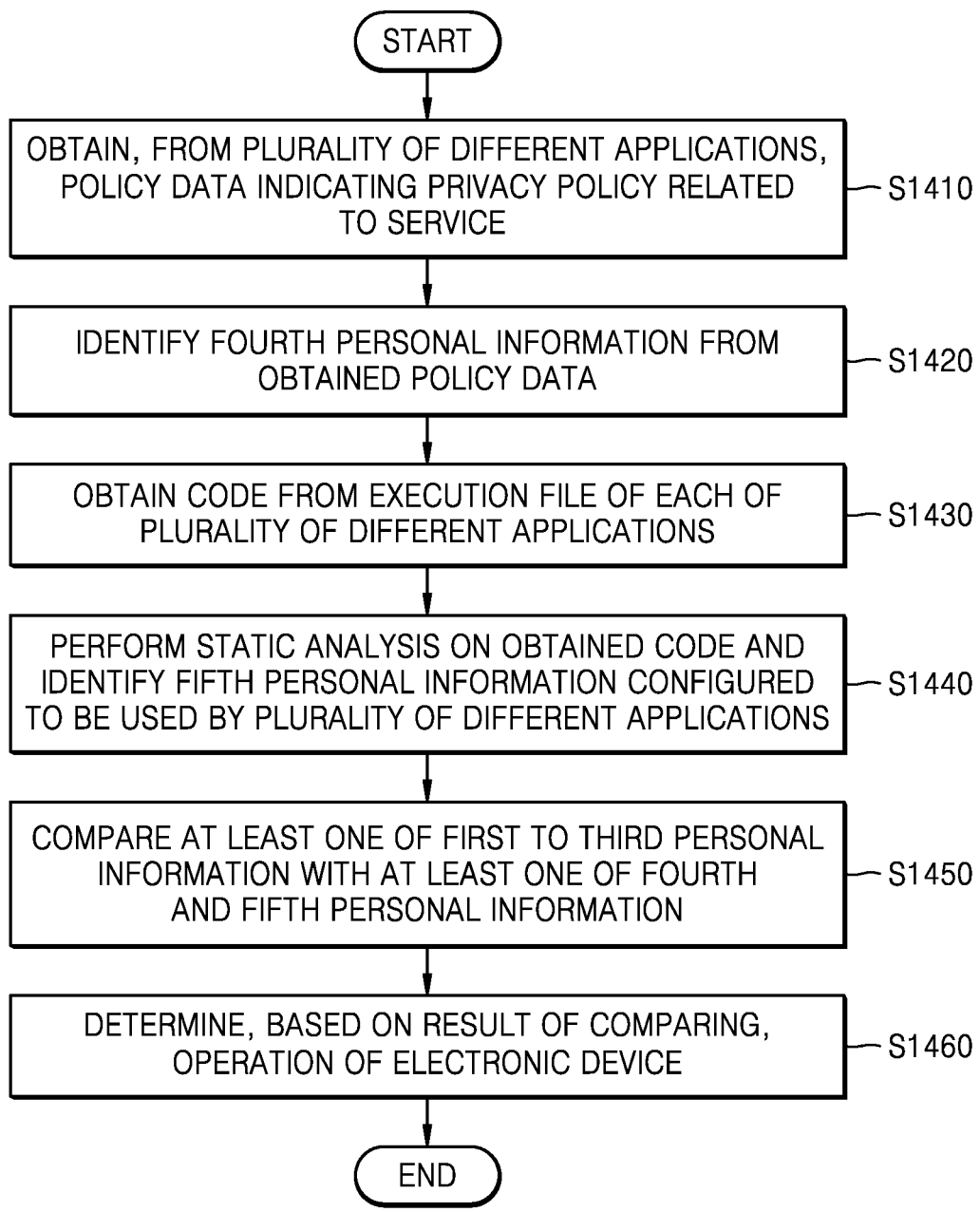

ELECTRONIC DEVICE FOR PROTECTING PERSONAL INFORMATION AND OPERATION METHOD THEREOF

CROSS-REFERENCE TO RELATED APPLICATIONS

This application is a continuation of International Application No. PCT/KR2021/011759 designating the United States, filed on Sep. 1, 2021, in the Korean Intellectual Property Receiving Office and claiming priority to Korean Patent Application No. 10-2020-0112549, filed on Sep. 3, 2020, in the Korean Intellectual Property Office, the disclosures of each of which are incorporated by reference herein in their entireties.

BACKGROUND

Field

The disclosure relates to an electronic device for protecting personal data and an operating method of the electronic device, and more particularly, to an electronic device for performing an operation of protecting user's personal data based on a result of analyzing a privacy policy, and an operating method of the electronic device.

Description of Related Art

The Korean Personal Information Protection Act or the European Union's General Data Protection Regulation (GDPR) requires a party for collecting personal information to comply with and take responsibility for the procedure encompassing generation, collection, storage, treatment, and disposal of the personal information. Accordingly, when a user receives a service using an electronic device, a party for providing the service may collect or share personal information by receiving an agreement of the user. However, the party may not abide by this regulatory procedure and may collect or share the personal information without permission, which leads to a problem.

The policy based on which a party for collecting personal information in order to provide a service may collect and share the personal information is declared in a privacy policy (a regulation for treating personal information). However, a user may not easily identify this policy, and there is no method to verify whether an actual operation of an electronic device for providing the service corresponds to the policy. Therefore, a technique to intuitively provide the content declared in the privacy policy to a user and to identify an operation of an electronic device that does not correspond to the privacy policy and take measures for protecting user's personal information is required.

SUMMARY

Various embodiments provide an electronic device for protecting personal information, the electronic device being capable of performing an operation of protecting a user's personal information by analyzing each of policy data indicating a privacy policy of a service, a code of an application providing the service, and an actual operation of the application providing the service and comparing data of each of the analyses, and an operating method of the electronic device.

According to an embodiment of the disclosure, a method, performed by an electronic device, of protecting user's personal data related to an application may include obtaining policy data indicating a user privacy policy related to a service provided by the electronic device, identifying, from the obtained policy data, first personal information to be used to provide the service, identifying, from an execution file of the application providing the service, second personal information configured to be used by the application, identifying third personal information used by the application while the application is executed, comparing the first personal information identified from the policy data, the second personal information identified from the execution file of the application, and the third personal information used by the application, and determining, based on a result of the comparing, an operation of the electronic device for protecting the user's personal data. The determined operation may be performed.

The determining of the operation of the electronic device may include, when the second personal information or the third personal information includes personal data not included in the first personal information, outputting notification information notifying that the application violates the privacy policy.

The determining of the operation of the electronic device may include, when the second personal information or the third personal information includes personal data not included in the first personal information, obfuscating the personal data included in the second personal information or the third personal information and not included in the first personal information.

The determining of the operation of the electronic device may include, when the second personal information or the third personal information includes personal data not included in the first personal information, restricting an operation, performed by the application, of using the personal data included in the second personal information or the third personal information and not included in the first personal information.

The identifying of the first personal information may include identifying the first personal information, based on data output by applying the obtained policy data indicating the privacy policy to a natural language understanding (NLU) model performing semantic role labeling.

The method may further include generating, based on the first personal information, summary information of the privacy policy and outputting the generated summary information.

The first personal information may include a list of collected personal data and a purpose of collecting the personal data.

The method may further include determining a category of the service, obtaining a plurality of pieces of policy data indicating user privacy policies related to a plurality of different services included in a same category as the determined category of the service, and identifying, from each of the plurality of pieces of policy data, fourth personal information to be used for each of the plurality of different services, wherein the comparing of the first, second, and third personal information may include comparing the first personal information, the second personal information, the third personal information, and the fourth personal information.

The method may further include identifying, from each of execution files of a plurality of different applications respectively providing the plurality of different services, fifth personal information configured to be used by the plurality of different applications, wherein the comparing of the first, second, and third personal information may include comparing the first personal information, the second personal information, the third personal information, the fourth personal information, and the fifth personal information.

According to an embodiment of the disclosure, an electronic device for protecting a user's personal data may include a communicator, an output unit, a memory storing one or more instructions, and a processor configured to execute the one or more instructions stored in the memory to obtain policy data indicating a user privacy policy related to a service provided by the electronic device, identify, from the obtained policy data, first personal information to be used to provide the service, identify, from an execution file of the application providing the service, second personal information configured to be used by the application, identify third personal information used by the application while the application is executed, compare the first personal information identified from the policy data, the second personal information identified from the execution file of the application, and the third personal information used by the application, and determine, based on a result of the comparing, an operation of the electronic device for protecting the user's personal data. The determined operation may be performed.

The processor may further be configured to execute the one or more instructions stored in the memory to, when the second personal information or the third personal information includes personal data not included in the first personal information, control the output unit to output notification information notifying that the application violates the privacy policy.

The processor may further be configured to execute the one or more instructions stored in the memory to, when the second personal information or the third personal information includes personal data not included in the first personal information, obfuscate the personal data included in the second personal information or the third personal information and not included in the first personal information.

The processor may further be configured to execute the one or more instructions stored in the memory to, when the second personal information or the third personal information includes personal data not included in the first personal information, restrict an operation, performed by the application, of using the personal data included in the second personal information or the third personal information and not included in the first personal information.

The processor may further be configured to execute the one or more instructions stored in the memory to identify the first personal information, based on data that is output by applying the obtained policy data indicating the privacy policy to a natural language understanding (NLU) model performing semantic role labeling.

The processor may further be configured to execute the one or more instructions stored in the memory to generate, based on the first personal information, summary information of the privacy policy and outputting the generated summary information.

The first personal information may include a list of collected personal data and a purpose of collecting the personal data.

The processor may further be configured to execute the one or more instructions stored in the memory to determine a category of the service, obtain a plurality of pieces of policy data indicating user privacy policies related to a plurality of different services included in a same category as the determined category of the service, identify, from each of the plurality of pieces of policy data, fourth personal information to be used for each of the plurality of different services, and compare the first personal information, the second personal information, and the third personal information by further using the fourth personal information.

The processor may further be configured to execute the one or more instructions stored in the memory to identify, from each of execution files of a plurality of different applications respectively providing the plurality of different services, fifth personal information configured to be used by the plurality of different applications, and compare the first personal information, the second personal information, the third personal information, and the fourth personal information by further using the fifth personal information.

According to an embodiment of the disclosure, a non-transitory computer-readable recording medium having recorded thereon a program for protecting user's personal data related to an application on a computer which, when executed, causes the computer to obtain policy data indicating a user privacy policy related to a service provided by the electronic device, identify, from the obtained policy data, first personal information to be used to provide the service, identify, from an execution file of the application providing the service, second personal information configured to be used by the application, identify third personal information used by the application while the application is executed, compare the first personal information identified from the policy data, the second personal information identified from the execution file of the application, and the third personal information used by the application, and determine, based on a result of the comparing, an operation of the electronic device for protecting the user's personal data.

BRIEF DESCRIPTION OF THE DRAWINGS

The aspects described above and other aspects, features, and advantages of a predetermined embodiment of the disclosure will be more apparent with reference to the detailed descriptions below and the accompanying drawings, in which:

FIG. 4 is a reference diagram for describing a user privacy policy obtained by an electronic device according to various embodiments;

FIG. 14 is a reference flowchart of an example operation, performed by an electronic device, of identifying fourth personal information and fifth personal information from applications included in the same or substantially the same category, and comparing the fourth personal information and the fifth personal information, according to various embodiments.

DETAILED DESCRIPTION

Figure 1:
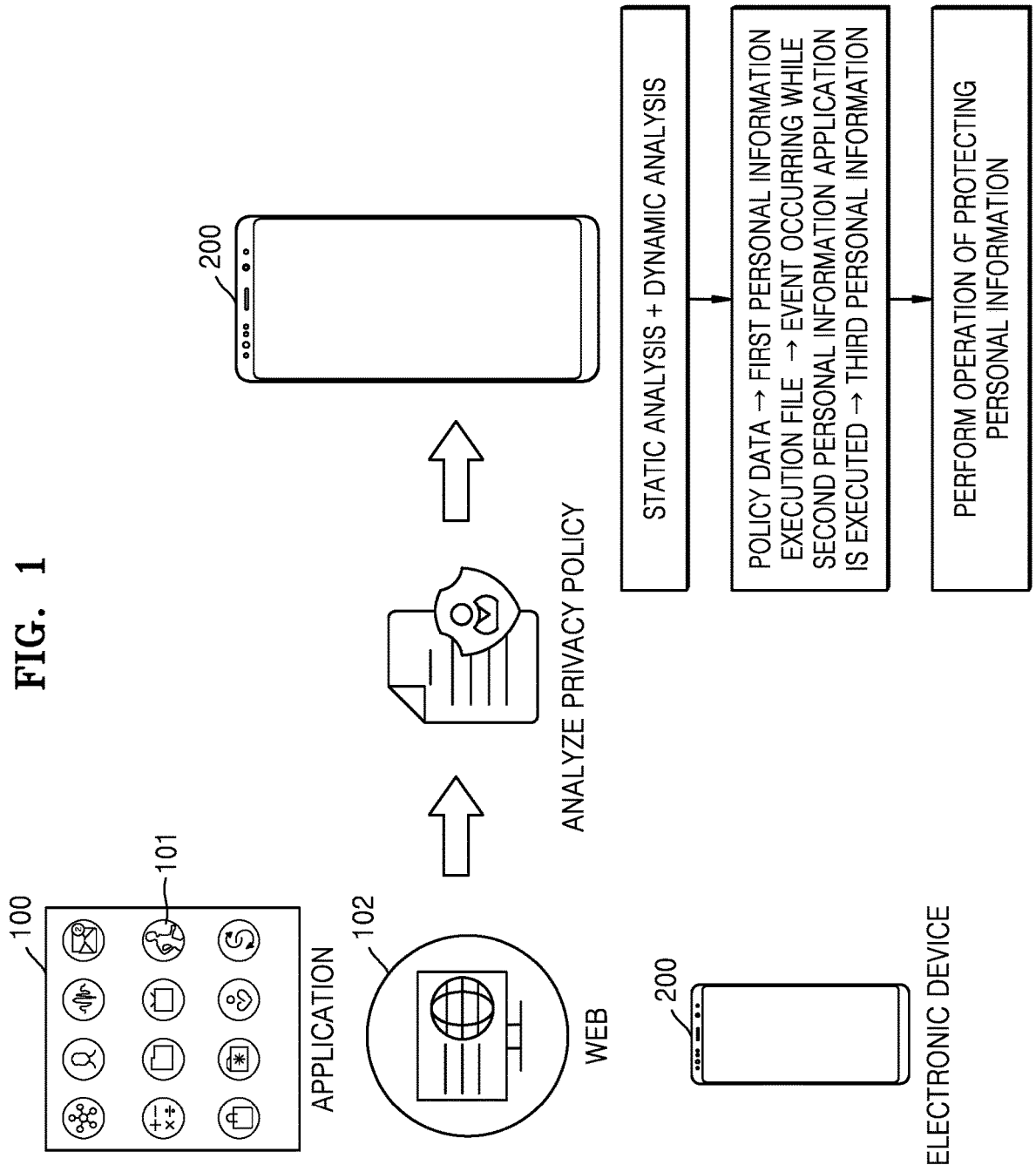
FIG. 1 is a diagram showing an example in which an electronic device analyzes policy data indicating a privacy policy related to provision of a service and performs an operation of protecting personal information, according to various embodiments.

Hereinafter, example embodiments will be described in more detail with reference to the accompanying drawings.

In the descriptions below, the same reference numerals are used for the same elements in different drawings. The aspects defined in this specification, such as detailed structures and components, are given to help with a comprehensive understanding of an example embodiments of the disclosure. However, it will be apparent that the example embodiments may be implemented without the particularly defined aspects above. Also, well-known functions or structures are unnecessary and may blur the explanation, and thus, will not be described in detail.

Throughout the disclosure, the expression "at least one of a, b, or c" indicates, for example, "a," "b," "c," "a and b," "a and c," "b and c," or "all of a, b, and c."

The terms used herein will be briefly described and then the disclosure will be described in detail.

In the disclosure, general terms that have been widely used nowadays are selected, when possible, in consideration of functions of the disclosure, but non-general terms may be selected according to the intentions of technicians in the art, precedents, new technologies, etc. Also, some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

Throughout the disclosure, it will be understood that when an element is referred to as "including" an element, the element may further include another element, rather than excluding other elements, unless mentioned otherwise. Also, terms such as "unit," "module," etc., described in the specification indicate a unit that processes at least one function or operation, and the unit may be embodied in a hardware manner, a software manner, or a combination of the hardware manner and the software manner.

Hereinafter, example embodiments of the disclosure will be described in detail with reference to the accompanying drawings, so that the example embodiments of the disclosure may be easily implemented by one of ordinary skill in the art. However, the disclosure may have different forms and should not be construed as being limited to the example embodiments of the disclosure described herein. Also, parts of the drawings that are not relevant to the description are omitted in order to clearly describe the disclosure.

In the disclosure, a privacy policy (privacy policy) may refer, for example, to a policy about a processing reference, protection measures, etc. with respect to a user's personal information used to provide a service and may include a detailed description of the provided service, a list of authorities related to a function of an electronic device, required for providing the service, etc.

In the disclosure, policy data may refer, for example, to data indicating the privacy policy described above. When an application uses personal information of a user to provide a service, the policy data indicating a user privacy policy may be associated with the application. The policy data indicating the privacy policy may be a uniform resource locator (URL) of a document in which the privacy policy is described or a hypertext markup language (HTML) document file of the privacy policy, but is not limited thereto.

In the disclosure, personal data is included in the personal information and may refer, for example, to a data element included in each of categories forming the personal information. The personal data may include, for example, an item of collected personal information, a collection method of the personal information, a usage purpose of the personal information, etc., but is not limited thereto and may refer to all kinds of data related to user's personal information used for service provision.

In the disclosure, the personal information may, for example, refer to a set of pieces of personal data and may be identified by various methods. Also, terms such as "first," "second," . . . , and "fifth" described below do not denote an order of pieces of personal information, but refer to separate pieces of personal information obtained from different sources using different methods.

In the disclosure, first personal information identified from the policy data indicating the privacy policy may refer, for example, to pieces of personal information requested by a service to be provided.

In the disclosure, second personal information identified from a code of an application may refer, for example, to pieces of personal information configured to be collected or shared by an application, a web, or an electronic device providing the service. The second personal information may be identified by, for example, determining whether the corresponding application or the like is programmed to collect or share the pieces of personal information, by analyzing the code of the application, the web, or the electronic device providing the service.

In the disclosure, third personal information identified from an event occurring during an operation of the application may refer, for example, to pieces of personal information actually collected or shared by the application, the web, or the electronic device providing the service while the application, the web, or the electronic device providing the service operates. The third personal information may be identified, for example, through an operation of collecting or sharing personal information, the operation being identified during service provision via monitoring of the service provision operation by the electronic device.

In the disclosure, fourth personal information identified from policy data indicating a privacy policy of another application may refer, for example, to pieces of personal information identified from the policy data of the application or the like which is different from the application, the web, or the electronic device providing the service. The fourth personal information may be identified, for example, by the same method as the first personal information.

In the disclosure, fifth personal information identified from a code of the other application may refer, for example, to pieces of personal information identified from the code of the application or the like which is different from the application, the web, or the electronic device providing the service. The fifth personal information may be identified, for example, by the same method as the second personal information.

In the disclosure, a natural language understanding (NLU) model may refer, for example, to an artificial intelligence (AI) model trained to obtain a semantic element of text by interpreting the text. In this case, the AI model may include a plurality of neural network layers. Each of the plurality of neural network layers may have a plurality of weight values, and perform neural network operation through operation between an operation result of the previous layer and the plurality of weight values.

FIG. 1 is a diagram showing an example in which an electronic device 200 according to various embodiments performs an operation of protecting personal information by analyzing policy data indicating a privacy policy related to provision of a service.

The electronic device 200 may obtain the policy data indicating the privacy policy, from an application 101, a web 102, or a device providing the service, may analyze the obtained policy data, and may control an operation of the electronic device 200 based on a result of the analyzing.

The electronic device 200 according to an embodiment may be a device capable of performing various functions by executing the application 101, accessing the web102, etc. For example, the electronic device 200 may include a mobile device, which is portable for a user, such as a smartphone, a tablet personal computer (PC), etc. As another example, the electronic device 200 may include a wearable device, which a user may wear, such as a wireless earphone, a smart watch, etc. As another example, the electronic device 200 may include various devices capable of executing the application 101, accessing the web 102, etc., such as a desktop PC, a notebook PC, a television (TV), a refrigerator, an air conditioner, a smart home appliance including a robot cleaner, etc., but the electronic device 200 is not limited thereto.

The electronic device 200 according to an embodiment may obtain, from various sources, the policy data indicating the privacy policy related to the service provided by the electronic device 200. For example, the electronic device 200 may obtain, from the application 101 executed by the electronic device 200, the policy data including personal data, which includes information collected or shared, authorities obtained, etc. for the application 101 to be executed and to perform functions. As another example, the electronic device 200 may obtain, from the web 102 that the electronic device 200 accesses, the policy data including personal data, etc. collected or shared by the corresponding web site, web page, or web application. As another example, the electronic device 200 may obtain the policy data including personal data, etc. that is collected or shared by the electronic device 200 itself. As another example, the electronic device 200 may obtain, from another electronic device (not shown), the policy data indicating personal data, etc. collected or shared by the other electronic device. The electronic device 200 may analyze the obtained policy data and may perform a static analysis on a code of the application 101, the web 102, the electronic device 200, or the other electronic device (not shown) and perform a dynamic analysis on the operation of the application 101, the web 102, the electronic device 200, or the other electronic device (not shown). Also, based on results of the policy data analysis, the static analysis, and the dynamic analysis, the electronic device 200 may determine the operation of the electronic device 200 for protecting a user's personal information. Hereinafter, for convenience of description, an electronic device 200, which is a "smartphone," according to an example embodiment will be described. According to an embodiment, the electronic device 200 may obtain policy data indicating a privacy policy from the application 101 executed by the smartphone, and, based on results of an analysis of the policy data and a static analysis and a dynamic analysis of the application 101, may control an operation of the smart phone. However, the disclosure is not limited thereto. As described above, various types of electronic devices may obtain, from various types of sources, the policy data indicating the privacy policy, according to embodiments.

Referring to FIG. 1, the electronic device 200 may include a plurality of applications 100 installed in the electronic device 200. When any one application 101 from among the applications 100 installed in the electronic device 200 uses personal information of a user, policy data indicating a privacy policy for processing the personal information of the user may be associated with the application 101. In order to analyze the privacy policy, the electronic device 200 may obtain the policy data indicating the policy for processing the user's personal information, related to a service provided by the corresponding application 101. The policy data obtained by the electronic device 200 may be an HTML document, but is not limited thereto.

The electronic device 200 according to an embodiment may identify, from the obtained policy data, first personal information described in the privacy policy in order to provide the service. For example, the first personal information identified by the electronic device 200 may include, for example, pieces of personal data, such as an item of collected personal information, a collection method, a purpose of usage, a data retention and usage period, a disposal procedure and a disposal method, etc. A detailed method performed by the electronic device 200 to identify the first personal information from the policy data will be described in detail with reference to FIGS. 5 and 6.

The electronic device 200 according to an embodiment may identify, from an execution file of the application 101 providing the service, second personal information configured to be used by the application 101. For example, the electronic device 200 may obtain the execution file of the application 101 and may perform a static analysis on a code related to the privacy policy. In detail, the electronic device 200 may identify, from the code included in the obtained execution file of the application 101, the second personal information including information about which personal data of the user the corresponding application 101 is programmed to collect, to which destination the application 101 is programmed to transmit the collected personal data of the user, which operation the application 101 is programmed to perform using the collected personal data of the user, etc.

The electronic device 200 according to an embodiment may identify third personal information used by the application 101, while the application 101 is executed. For example, the electronic device 200 may perform a dynamic analysis monitoring the operation of the application 101. In detail, while the application 101 is executed and operates, the electronic device 200 may identify the third personal information including information about which personal data of the user the corresponding application 101 actually collects, to which destination the application 101 transmits the collected personal data of the user, which operation the application 101 performs using the collected personal data of the user, etc. A detailed method performed by the electronic device 200 to perform the static analysis on the code of the application 101 and the dynamic analysis on the operation of the application 101, according to an example embodiment, will be described in detail with reference to FIGS. 7 and 8.

The electronic device 200 according to an embodiment may compare the first personal information identified from the policy data, the second personal information identified from the execution file of the application 101, and the third personal information used by the application 10, and based on a result of the comparing, may determine an operation of the electronic device 200 for protecting the user's personal data.

For example, the electronic device 200 may compare the first personal information and the second personal information, and when the personal data included in the second personal information configured to be used by the application 101 providing the service to the user includes personal data other than the personal data included in the first personal information described in the privacy policy related to the service, the electronic device 200 may determine an operation of the electronic device 200 for protecting the user's personal data.

As another example, the electronic device 200 may compare the first personal information and the third personal information, and, when the personal data included in the third personal information used while the application 101 providing the service to the user is executed includes personal data other than the personal data included in the first personal information described in the privacy policy related to the service, the electronic device 200 may determine an operation of the electronic device 200 for protecting the user's personal data. A method performed by the electronic device 200 to compare the first, second, and third personal information will be described in detail with reference to FIG. 9, and a method performed by the electronic device 200 to determine, based on a result of the comparing of the first, second, and third personal information, an operation of the electronic device 200 for protecting the user's personal data will be described in detail with reference to FIG. 10.

Figure 2:
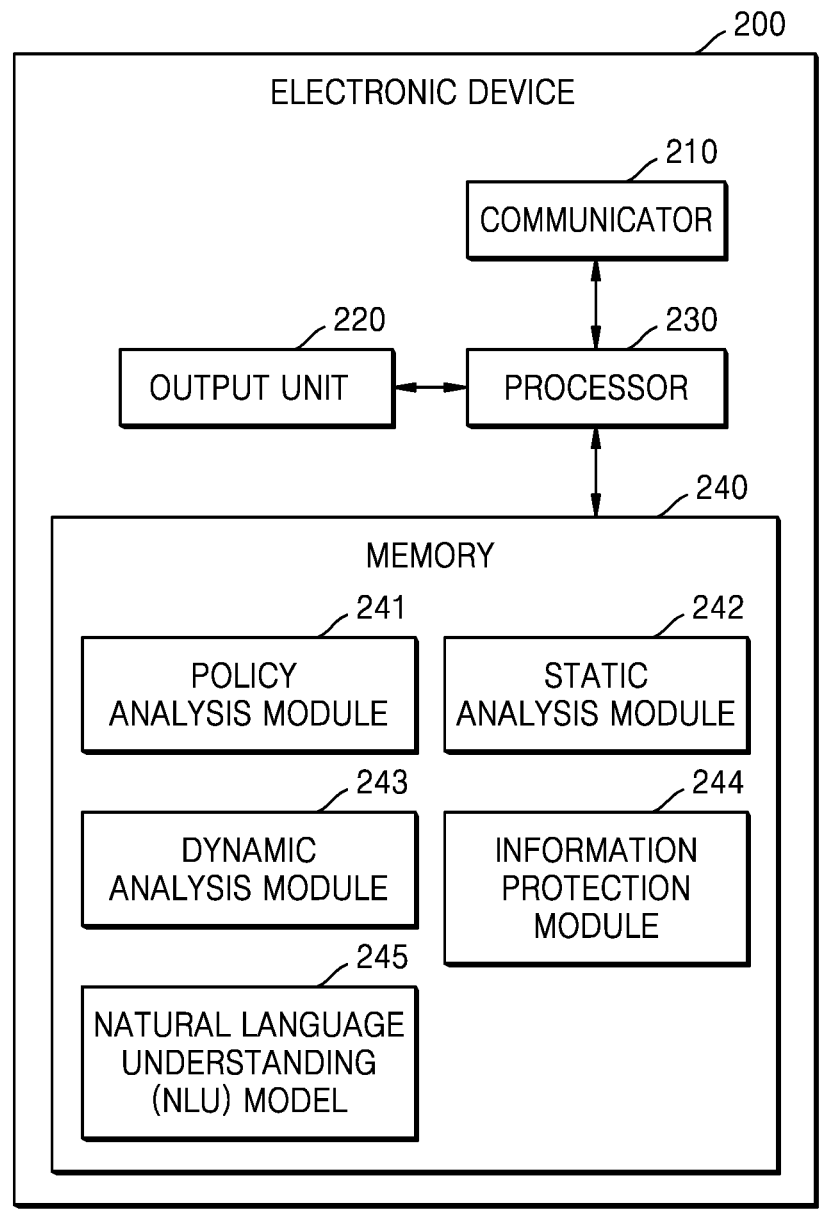
FIG. 2 is a block diagram of components of an example electronic device according to various embodiments.

FIG. 2 is a block diagram of components of an example electronic device 200 according to various embodiments.

The electronic device 200 according to an embodiment may be configured to include at least a communicator 210, an output unit 220, a processor 230, and a memory 240.

The communicator 210 (including, e.g., communication circuitry) may transmit and receive data or a signal to and from an external device (for example, another electronic device (not shown), a recognition server (not shown), or a service provision server (not shown)) according to control by the processor 230.

The communicator 210 according to an embodiment may include a short-range wireless communication unit, a mobile communicator, etc. according to the performance and the structure of the electronic device 200, but is not limited thereto.

The short-range wireless communication unit may include a Bluetooth communicator, a Bluetooth low energy (BLE) communicator, a near-field communication unit, a wireless local area network (WLAN) (or Wi-Fi) communicator, a Zigbee communicator, an infrared data association (IrDA) communicator, a Wi-Fi direct (WFD) communicator, an ultra-wideband (UWB) communicator, an Ant+ communicator, a microwave (μWave) communicator, etc., but is not limited thereto.

The mobile communicator may transceive a wireless signal with at least one of a base station, an external terminal, or a server on a mobile communication network. Here, the wireless signal may include a sound signal, a video-telephony signal, or various forms of data according to transmission and reception of a text/multimedia message.

The communicator 210 according to an embodiment may transceive data required for a user of the electronic device 200 to receive a service with the service provision server (not shown). Also, when an application, etc. providing the service uses pieces of personal data not described in the privacy policy, the communicator 210 according to an embodiment may obfuscate and transmit the data transmitted to the service provision server (not shown) in order to protect the personal data of the user. Also, the communicator 210 according to an embodiment may receive, from the other electronic device (not shown), pieces of policy data indicating the privacy policy and data with respect to personal information used by the other electronic device (not shown) and may transmit, to the other electronic device (not shown), control information for protecting the user's personal data. The processor 230 may control the communicator 210 to transmit and receive the pieces of information described above.

The output unit 220 (including, e.g., output circuitry) may be configured to output an audio signal or a video signal and may include, but is not limited to, a speaker, a display, etc.

The speaker of the output unit 220 according to an embodiment may output audio data received from the communicator 210 or stored in the memory 240. Also, the speaker may output a sound signal related to a function performed by the electronic device 200.

The display of the output unit 220 according to an embodiment may display information processed by the electronic device 200. For example, the display may display visual information related to the service provided by the electronic device 200, display a result of analyzing the privacy policy related to the service provided by the electronic device 200, or display notification information, etc. provided to the user to protect the personal data. However, the display is not limited thereto. Also, the display may display a user interface (UI) or a graphic user interface (GUI) related to a setting of the electronic device 200.

When the display of the output unit 220 forms a layered structure with a touch pad to be realized as a touch screen, the display not only may be used as an output unit, but also may be used as an input unit. The display may include at least one of a liquid crystal display, a thin-film transistor-liquid crystal display, an organic light-emitting diode, a flexible display, a three-dimensional (3D) display, and an electrophoretic display. Also, according to a form in which the electronic device 200 is realized, the electronic device 200 may include at least two displays.

The processor 230 (including, e.g., processing circuitry) may control generation operations of the electronic device 200. The processor 230 may execute one or more instructions of a program stored in the memory 240.

The processor 230 according to an embodiment may include an application processor (AP), a central processing unit (CPU), a graphics processing unit (GPU), a neural processing unit, an AI-dedicated processor designed to have a hardware structure specialized for processing an AI model, or the like.

The processor 230 according to an embodiment may obtain the policy data indicating the privacy policy and analyze the privacy policy. The processor 230 may use a policy analysis module 241 to obtain the policy data indicating the user privacy policy related to the service provided by the electronic device 200 and identify, from the obtained policy data, first personal information used to provide the service. Also, when the processor 230 identifies the first personal information using the policy analysis module 241, the processor 230 may use an NLU model 245 stored in the memory 240.

The processor 230 according to an embodiment may perform a static analysis on an execution file of the application providing the service. The processor 230 may use a static analysis module 242 to analyze a code of the application providing the service and identify second personal information that the application is configured to use. For example, the processor 230 may identify a part of the code, the part being programmed to collect or share the personal data, and may store the identified part as the second personal information. In detail, the processor 230 according to an embodiment may, through the static analysis on the execution file of the application, detect a variable, a function name, an operation, etc. in the code and identify which personal data (for example, specific data of the electronic device 200 or user data) the application is to collect and which destination (for example, an advertisement platform) to which the application is to transmit the collected personal data and may store the identified data as the second personal information.

The processor 230 according to an embodiment may perform a dynamic analysis on an operation of the electronic device 200 while the application providing the service is executed. The processor 230 may use a dynamic analysis module 243 to identify third personal information that the application providing the service actually uses. For example, the processor 230 may monitor an operation of the application and identify the operation, performed by the application, of collecting or sharing the personal data and may store the identified operation as the third personal information. In detail, the processor 230 according to an embodiment may identify, through the monitoring of the operation of the application, which personal data the application actually collects and may identify, through the monitoring of the operation of the application, to which destination the collected personal data is actually transmitted, and may store the identified data as the third personal information.

The processor 230 according to an embodiment may compare the identified first personal information, second personal information, and third personal information and, based on a result of the comparing, may determine an operation of the electronic device 200 for protecting the personal data. By using an information protection module 244, the processor 230 may compare the first, second, and third personal information and may provide a notification for protecting the personal data of the user when the application providing the service collects or shares personal data not described in the privacy policy. Also, when the application collects or shares the personal data not described in the privacy policy, the processor 230 may perform obfuscation on the collected or shared personal data or restrict the operation of collecting or sharing the corresponding personal data.

The memory 240 may store various data, programs, or applications for driving and controlling the electronic device 200. The program stored in the memory 240 may include one or more instructions. The program (the one or more instructions) or the application stored in the memory 240 may be executed by the processor 230.

The memory 240 according to an embodiment may include at least one type of storage medium from among a flash memory type, a hard disk type, a multimedia card micro type, a card-type memory (for example, an SD memory or an XD memory), random-access memory (RAM), static RAM (SRAM), read-only memory (ROM), electrically erasable programmable ROM (EEPROM), programmable ROM (PROM), a magnetic memory, a magnetic disk, and an optical disk. Also, the electronic device 200 may operate a web storage or a cloud server performing a storage function on the Internet.

The memory 240 according to an embodiment may include the policy analysis module 241, the static analysis module 242, the dynamic analysis module 243, and the information protection module 244. The memory 240 according to an embodiment may store the NLU model 245 for extracting semantic roles by performing semantic role labeling on data indicating the privacy policy.

Figure 3:
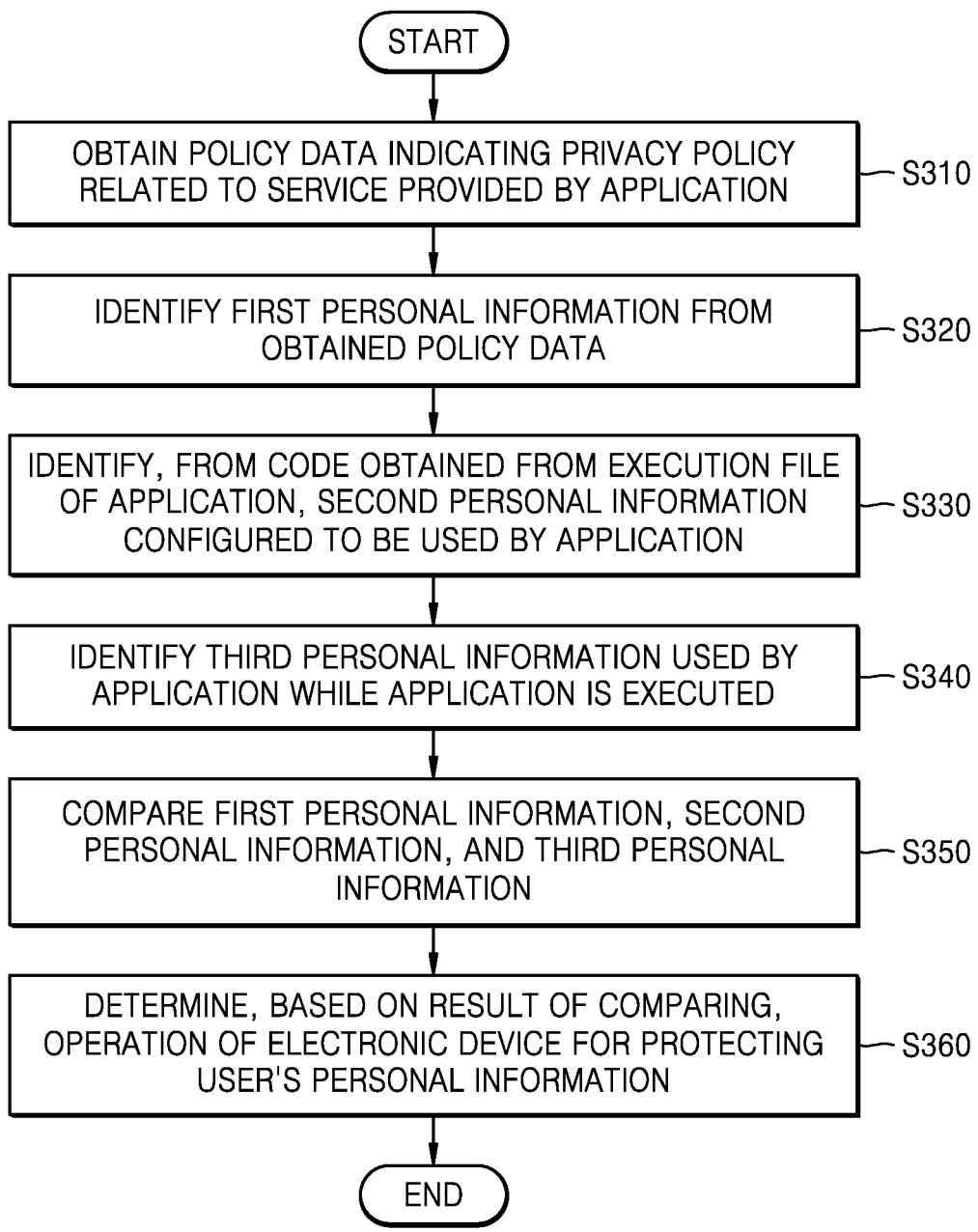
FIG. 3 is a flowchart of operations of an example method, performed by an electronic device, of analyzing a privacy policy and determining an operation of the electronic device, in order to protect user's personal information, according to various embodiments.

FIG. 3 is a flowchart of operations of an example method, performed by an electronic device, of analyzing a privacy policy and determining an operation of the electronic device, in order to protect user's personal information, according to various embodiments.

In operation S310, the electronic device 200 may obtain policy data indicating a user privacy policy related to a service provided by the electronic device 200. The service provided by the electronic device 200 may include a service provided through an application executed by the electronic device 200, a service provided through a web site accessed by the electronic device 200, a service directly provided by the electronic device 200, etc. When the service provided by the electronic device 200 uses a user's personal information, the electronic device 200 may obtain the policy data indicating the user privacy policy related to the service. The policy data indicating the privacy policy may, for example, be a URL of a document in which the privacy policy is described or an HTML document file of the privacy policy, but is not limited thereto.

In operation S320, the electronic device 200 may identify, from the obtained policy data, the first personal information used to provide the service. For example, the electronic device 200 may identify, from the policy data, pieces of text indicating the privacy policy and may store the identified pieces of text as the first personal information. In this case, the first personal information identified by the electronic device 200 may include personal data, such as an item of collected personal information, a collection method, a purpose of usage, data retention and usage period, a disposal procedure and a disposal method, etc. Also, when the electronic device 200 identifies the first personal information, the electronic device 200 may identify the first personal information by implementing the NLU model performing semantic role labeling.

The electronic device 200 may compare the identified first personal information with the second personal information or the third personal information and may detect whether the service collects or shares personal data not described in the privacy policy.

In operation S330, the electronic device 200 may identify, from an execution file of the application providing the service, the second personal information configured to be used by the application. The execution file may include, for example, an EXE or APK application program file, but is not limited thereto. The electronic device 200 may obtain a code of the application from the execution file of the application and perform a static analysis on the obtained code to identify the second personal information including information about which personal data of the user the application is programmed to share or collect or to which destination the application is programmed to transmit the personal data of the user.

In operation S340, the electronic device 200 may identify the third personal information used by the application while the application providing the service is used. The electronic device 200 may perform a dynamic analysis monitoring an operation of the application, on each of events occurring in the application according to a user's input or a predetermined condition. For example, the electronic device 200 may identify the third personal information including information about which personal data of the user is collected or shared while the application is executed or to which destination the personal data of the user is transmitted.

In operation S350, the electronic device 200 may compare the first personal information, the second personal information, and the third personal information. For example, the electronic device 200 may compare the first personal information identified from the policy data indicating the privacy policy with the second personal information identified from the execution file of the application and may identify whether the application is programmed to collect personal data not described in the privacy policy, whether the application is programmed to transmit the personal data to a different destination from a destination described in the privacy policy, or the like. As another example, the electronic device 200 may compare the first personal information identified from the policy data indicating the privacy policy with the third personal information used while the application is executed and may identify whether the application collects personal data not described in the privacy policy, whether the application transmits the personal data to a different destination from a destination described in the privacy policy, or the like. As another example, the electronic device 200 may compare the first personal information with the second personal information and the third personal information and may identify whether the application is configured to collect or share personal data not described in the privacy policy, whether the application performs an operation other than the operation of collecting or sharing the personal data described in the privacy policy, or the like.

In operation S360, the electronic device 200 may determine, based on a result of the comparing of operation S350, an operation of the electronic device 200 for protecting user's personal information. For example, when an operation not described in the privacy policy is identified from among operations of the application, the electronic device 200 may output notification information for notifying that the application violates the privacy policy and provide the notification information to the user. As another example, when an operation not described in the privacy policy is identified from among operations of the application, the electronic device 200 may perform obfuscation on personal data collected or shared through the identified operation. As another example, when the operation not described in the privacy policy is identified from among operations of the application, the electronic device 200 may control the application not to perform the corresponding operation.

The case in which a service provider is the application is described above, according to an example embodiment. However, the disclosure is not limited thereto. In the case in which a web site or the electronic device 200 provides a service, the electronic device 200 may also analyze the privacy policy and control the operation of the electronic device 200 using the same method.

FIG. 4 is a reference diagram for describing policy data indicating a privacy policy, obtained by an electronic device, according to various embodiments.

Referring to FIG. 4, the electronic device 200 according to an embodiment may provide various services 410 to a user, and in this case, a privacy policy with respect to the personal information used for each service may be described. The services 410 provided to the user by the electronic device 200 may include a service provided by a first party, which is a manufacturer of the electronic device 200, etc., a service provided by a second party, which is a subsidiary or an affiliated company (e.g., a communication company in the case of a smartphone) of the manufacturer of the electronic device 200, a service provided by a third party, which includes companies other than the companies described above, etc.

The electronic device 200 according to an embodiment may obtain, from an application, a web, or the electronic device 200 providing a service, the policy data indicating the privacy policy, in order to analyze the privacy policy describing personal information, etc. used to provide the service to a user. For example, when the service that the electronic device 200 provides to the user is Bixby 415, an AI sound assistant service, the privacy policy of Bixby 415 may be a privacy policy 420 of FIG. 4, and the electronic device 200 may obtain the policy data indicating the privacy policy 420 of Bixby 415. The obtained policy data may be a URL of a document in which the privacy policy is described or an HTML document file of the privacy policy, but is not limited thereto.

Figure 5:
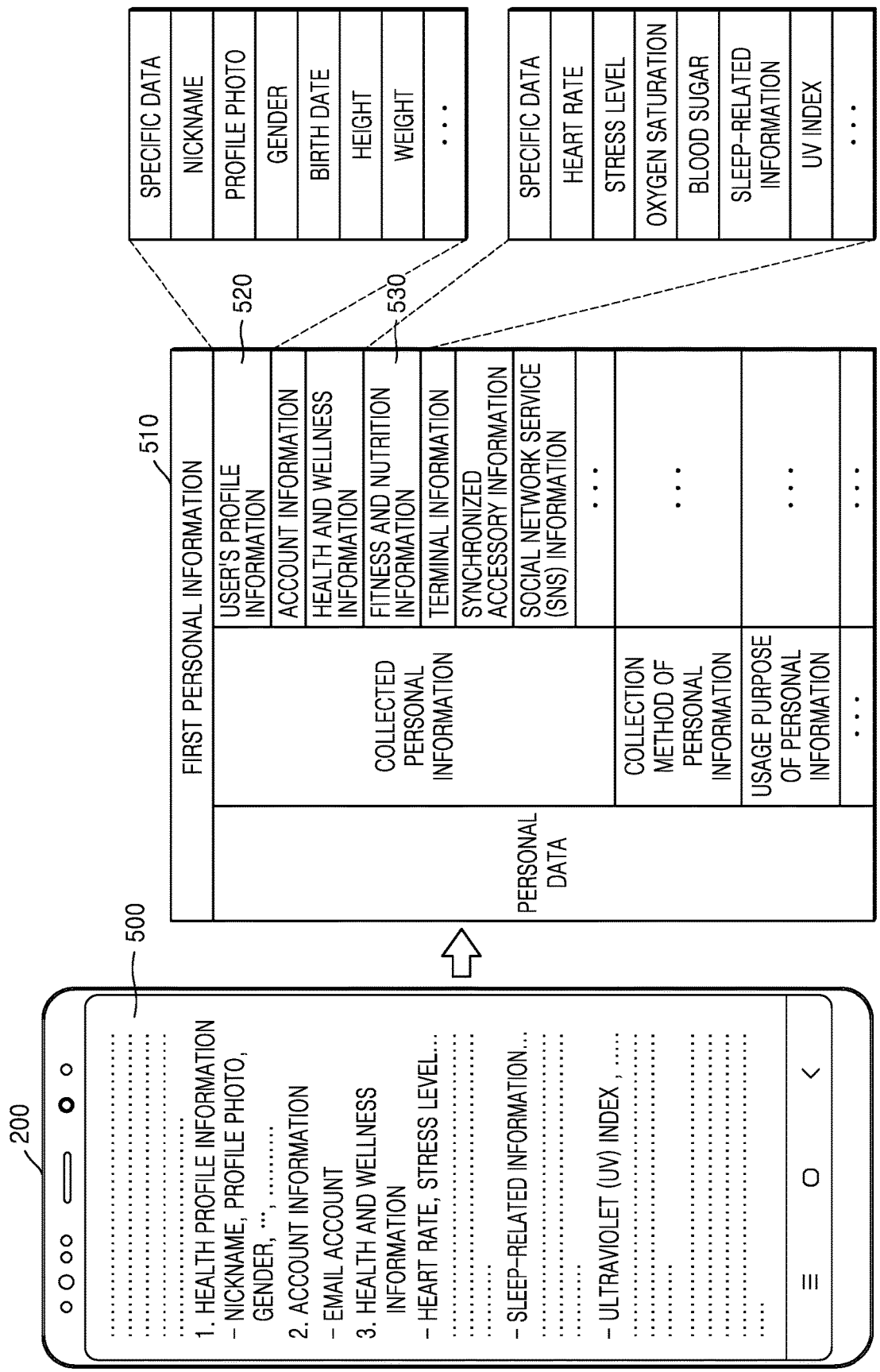
FIG. 5 is a reference diagram for describing an example method, performed by an electronic device, of identifying first personal information from policy data indicating a privacy policy, according to various embodiments.

FIG. 5 is a reference diagram for describing an example method, performed by an electronic device, of identifying first personal information from policy data indicating a privacy policy, according to various embodiments.

Referring to FIG. 5, the electronic device 200 according to an embodiment may identify, from the policy data (for example, an HTML file) indicating the privacy policy, the first personal information. The electronic device 200 may identify, from policy data 500 indicating the privacy policy, the first personal information, using a method by which a word or a phrase corresponding to personal data is identified based on a predetermined condition.

For example, an application providing a health care service may use personal information of a user to provide the health care service. In this case, the electronic device 200 may obtain the policy data 500 indicating the privacy policy with respect to the personal information used to provide the health care service. The electronic device 200 may identify, from the policy data 500, first personal information 510, by identifying words such as " . . . information," etc. which are included in a predetermined condition.

The first personal information 510 collected by the electronic device 200 according to an embodiment to provide the health care service may include personal data, such as user's profile information, user's account information, user's health and wellness information, user's fitness and nutrition information, user's terminal information, user's synchronized accessory information, user's social network service (SNS) information, etc. Also, the pieces of personal data included in the first personal information 510 may further include specific pieces of data included in personal data categories. For example, user profile information 520 among the pieces of personal data may include specific data, such as a nickname, a profile photo, a gender, a birth date, a height, a weight, etc. of the user. As another example, fitness and nutrition information 530 among the pieces of personal data may include specific data, such as a heart rate, a stress level, an oxygen saturation, a blood sugar, sleep-related information, an ultraviolet (UV) index, etc. of the user. Also, the first personal information 510 may include a list of collected personal data. The electronic device 200 may compare the first personal information 510 identified from the privacy policy with at least one of the second personal information and the third personal information and may detect whether an application, etc. providing the service collects or shares personal data not described in the privacy policy.

Also, the first personal information 510 collected by the electronic device 200 according to an embodiment to provide the health care service may further include personal data, such as a method of collecting user's personal information via the application, a purpose of usage of the personal information, an access authority obtained by the application to collect the personal information, etc. In this case, the electronic device 200 may further use the personal data, such as the method of collecting personal information, the purpose of usage, the access authority of the application, etc. to detect whether the application, etc. performs an operation of collecting or sharing the personal data not described in the privacy policy.

Figure 6:
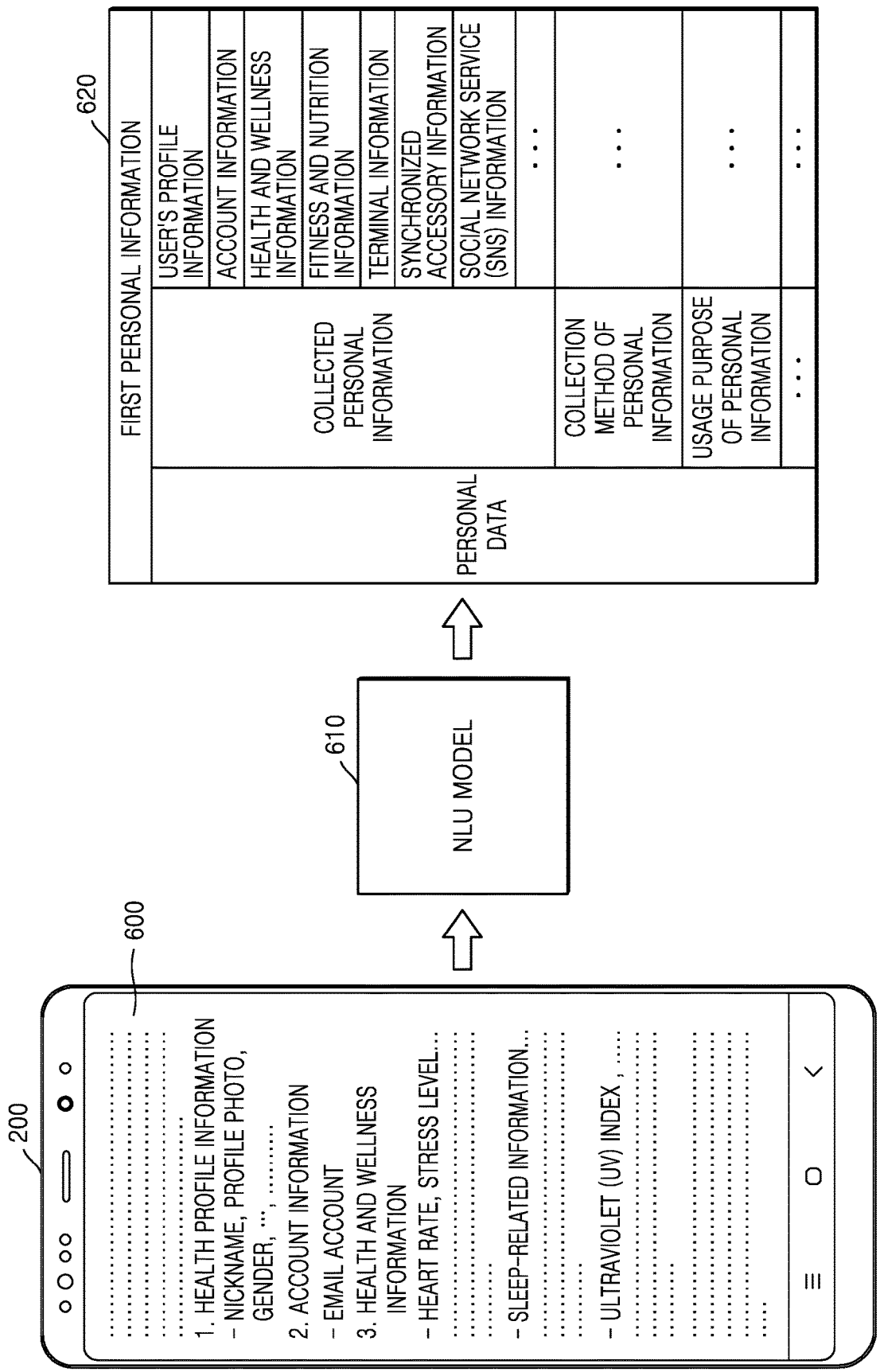
FIG. 6 is a reference diagram for describing an example method, performed by an electronic device, of identifying first personal information from policy data indicating a privacy policy, according to various embodiments.

FIG. 6 is a reference diagram for describing an example method, performed by an electronic device, of identifying first personal information from policy data indicating a privacy policy, according to various embodiments.

Referring to FIG. 6, the electronic device 200 according to an embodiment may identify, from policy data (for example, an HTML file) indicating a privacy policy, first personal information. The electronic device 200 may apply policy data 600 indicating the privacy policy to an NLU model 610 and may identify first personal information 620 based on data output from the NLU model.

The electronic device 200 according to an embodiment may analyze the policy data 600 indicating the privacy policy using the NLU model performing semantic role labeling. For example, in order to identify the first personal information 620 collected to provide a health care service, the electronic device 200 may extract a text element from the data 600 indicating the privacy policy, determine a semantic role of a sentence element using the NLU model 610, and extract pieces of personal data included in the text to identify the first personal information 620. Via this operation, regardless of an order of lists of collected personal information, a structure of an arrangement of each sentence element of the sentences describing the privacy policy, and the like, the electronic device 200 may identify, from the text indicating various forms of privacy policies, pieces of personal data (the first personal information 620) collected based on the privacy policy.

The description above is given based on an example in which the electronic device 200 applies the semantic role-determination method using the NLU model 610. However, the disclosure is not limited thereto. The electronic device 200 may use various natural language processing methods for implementing the NLU model 610, to identify the first personal information 620 from the text indicating the privacy policy.

The first personal information 620 that the electronic device 200 collects to provide the health care service may include personal data, such as user's profile information, user's account information, user's health and wellness information, user's fitness and nutrition information, user's terminal information, user's synchronized accessory information, user's SNS information, etc. Also, the pieces of personal data included in the first personal information 620 may further include specific pieces of data included in personal data categories. The description about the specific pieces of data is given with reference to FIG. 5, and thus, the same description is not repeated here.

Figure 7:
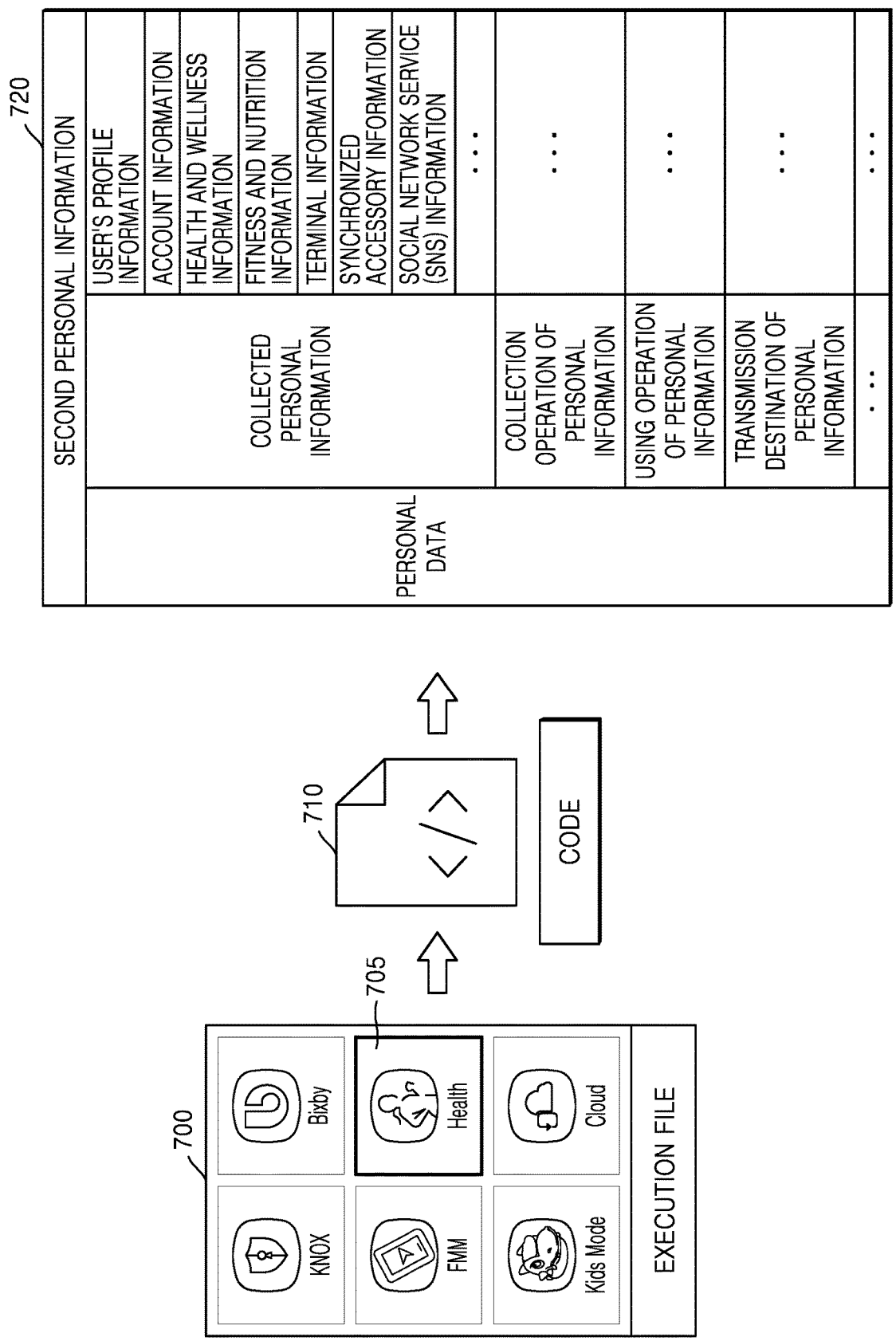
FIG. 7 is a reference diagram for describing an example method, performed by an electronic device, of identifying, from an execution file of an application providing a service, second personal information configured to be used by the application, according to various embodiments.

FIG. 7 is a reference diagram for describing an example method, performed by an electronic device, of identifying, from an execution file of an application providing a service, second personal information configured to be used by the application, according to various embodiments.

Referring to FIG. 7, the electronic device 200 may obtain execution files 700 of various applications executed by the electronic device 200 to provide a service. In this case, the execution files 700 of the applications, obtained by the electronic device 200, may include EXE or APK application program files, but are not limited thereto.

For example, the electronic device 200 may obtain an execution file 705 of a health care application among the execution files 700 of the applications. The electronic device 200 may obtain a code 710 of the application from the obtained execution file 705 of the health care application. A method performed by the electronic device 200 to obtain the code 710 of the application may include, for example, obtaining the code by decompiling the execution file of the application, but is not limited thereto. The electronic device 200 may obtain a source code of the application from another external source.

The electronic device 200 according to an embodiment may obtain the code 710 of the application from the execution file 705 of the application and may perform a static analysis on the obtained code, to identify second personal information 720 including information about which personal data of a user the application is programmed to share or collect and/or to which destination the personal data of the user is programmed to be transmitted.

For example, the electronic device 200 may perform the static analysis on the code 710 of the application obtained from the execution file 705 of the health care application and may identify pieces of personal data, such as user's profile information, user's account information, user's health and wellness information, user's fitness and nutrition information, user's terminal information, user's synchronized accessory information, user's SNS information, etc., that the health care application collects and shares. Also, the electronic device 200 may identify the second personal information 720 including personal data with respect to a personal data collection operation with respect to by which method the health care application collects personal data (e.g., an input of a user, a measurement by a device when a service is used, an automatic collection when the service is executed, a collection by a partner application, etc.), a personal data-usage operation with respect to in which circumstances the personal data is used, a personal data transmission destination with respect to which destination the personal data is transmitted to, an authority configured to be obtained for the application to be executed and perform a function, etc. Also, the pieces of personal data included in the second personal information 720 may further include specific pieces of data included in personal data categories. The description about the specific pieces of data is given with reference to FIG. 5, and thus, the same description is not repeated here.

Figure 8:
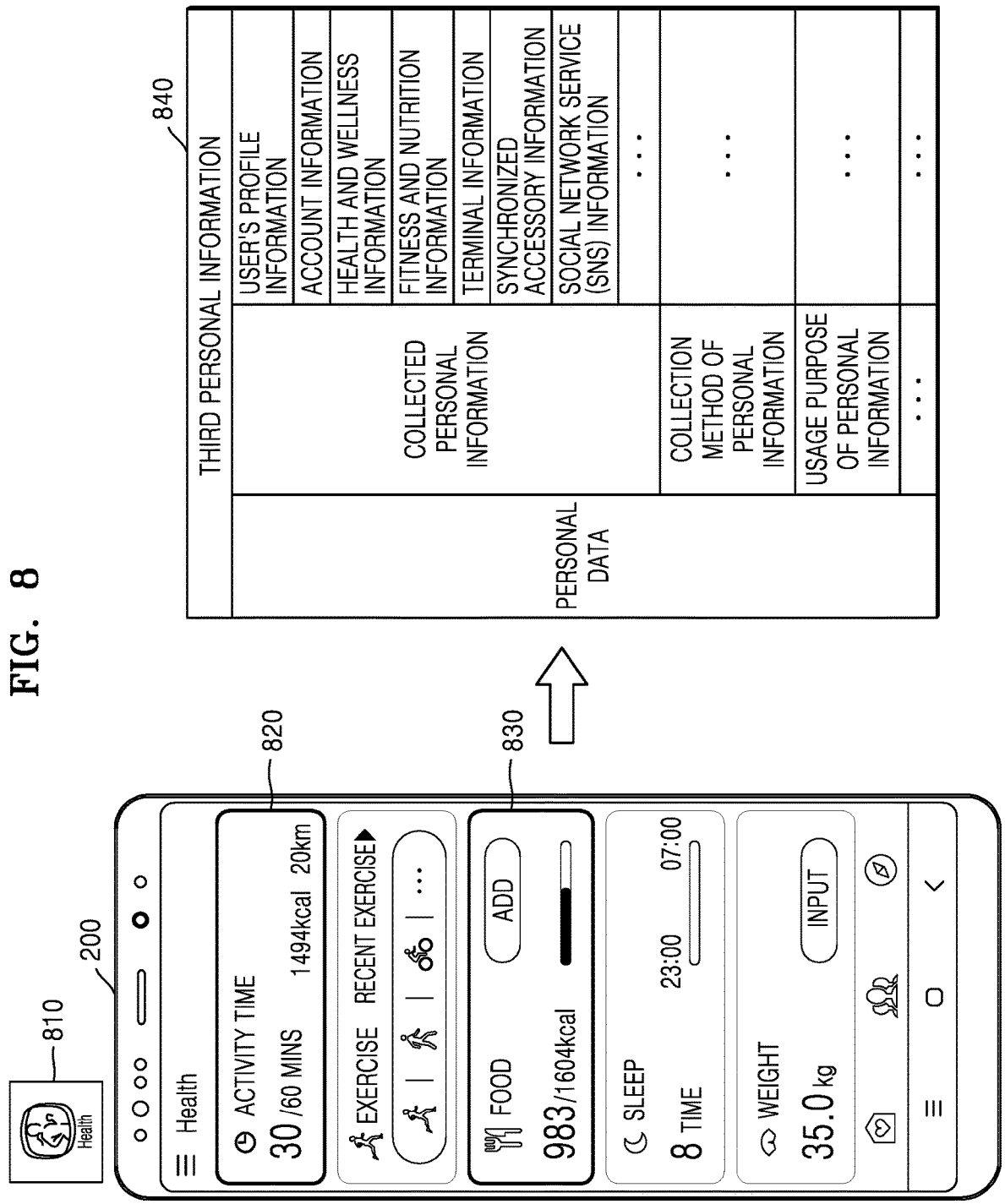
FIG. 8 is a reference diagram for describing an example method, performed by an electronic device, of identifying third personal information used by an application while the application is executed, according to various embodiments.

FIG. 8 is a reference diagram for describing an example method, performed by an electronic device, of identifying third personal information used by an application while the application is executed, according to various embodiments.

Referring to FIG. 8, the electronic device 200 may perform a dynamic analysis monitoring an operation of the application, the operation of the application corresponding to each of events occurring in the application according to a user's input or a predetermined condition.

The electronic device 200 according to an embodiment may identify third personal information 840 by monitoring the operation of the application while a health care application 810 is executed. For example, when a user is exercising, for example, walking or running, etc., the electronic device 200 may collect personal data, such as location information, acceleration information, exercise time information 820, etc. of the user. As another example, when a user inputs food information after having a meal, the electronic device 200 may collect the input food information 830 as personal data. The electronic device 200 may identify third personal information 840 including the personal data collected while the application is executed and the personal data about a personal data collection operation performed by the application, a personal data using operation by the application, a destination to which the application transmits the personal data, etc. Also, the pieces of personal data included in the third personal information 840 may further include specific pieces of data included in personal data categories. The description about the specific pieces of data is given with reference to FIG. 5, and thus, the same description is not repeated here.

Figure 9:
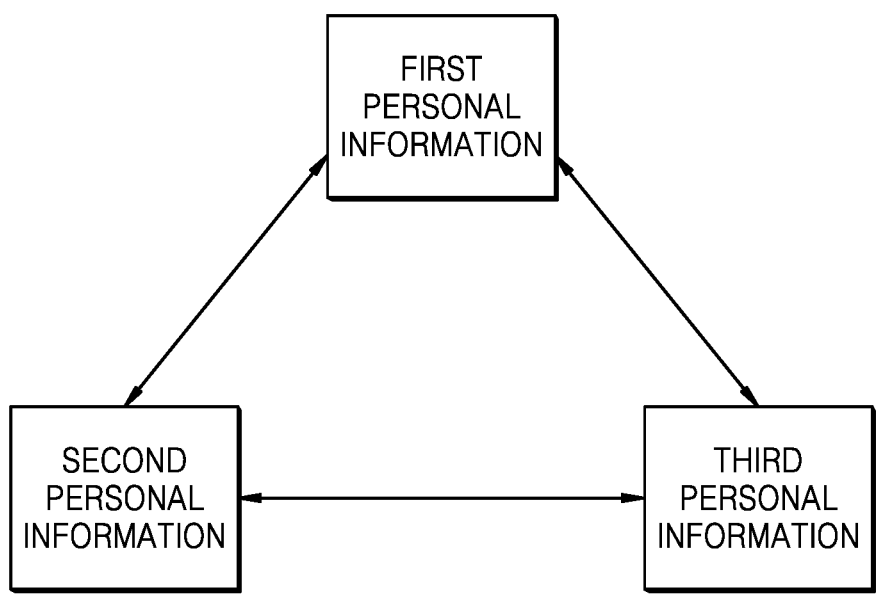
FIG. 9 is a reference diagram for describing an example method, performed by an electronic device, of comparing first personal information, second personal information, and third personal information, according to various embodiments.

FIG. 9 is a reference diagram for describing an example method, performed by an electronic device, of comparing first personal information, second personal information, and third personal information, according to various embodiments.

The electronic device 200 according to an embodiment may compare the first personal information, the second personal information, and the third personal information with each other and may identify whether there is personal data not corresponding to each other.

For example, the electronic device 200 may compare the first personal information with the second personal information and identify whether an application providing a service is programmed to collect or share personal data other than personal data described in a privacy policy of the service. Also, the operation of comparing the first personal information with the second personal information, performed by the electronic device 200, may also be performed, when the application is not executed, and may be performed before the identifying of the third personal information while the application is executed as described with reference to operation S340 of FIG. 3.

As another example, the electronic device 200 may compare the first personal information with the third personal information and identify whether the application performs an operation of collecting or sharing personal data other than the personal data described in the privacy policy of the service while the application providing the service is executed.

As another example, the electronic device 200 may compare the second personal information with the third personal information and identify whether the personal data that the application providing the service is programmed to collect or share is different from the personal data that the application providing the service collects or shares while the application providing the service is executed.

As another example, the electronic device 200 may simultaneously compare any one of the first, second, or third personal information with the remaining personal information and may simultaneously compare the first, second, and third personal information. Also, when the electronic device 200 compares the first, second, and third personal information, the electronic device 200 may not only determine whether the personal data not described in the privacy policy is collected or shared, but may also determine, by further using information about a purpose of collecting and using the personal data, a destination to which the personal data is transmitted, etc., whether the personal data described in the privacy policy is collected and used for other purposes or is transmitted to other destinations, even when the personal data described in the privacy policy is collected.

The electronic device 200 according to an embodiment may compare the first, second, and third personal information and identify whether there is a difference among the privacy policy, the programmed configuration of the application, and the actual operation of the application, and when there is a difference, the electronic device 200 may determine an operation of the electronic device 200 for protecting the personal data.

Figure 10:
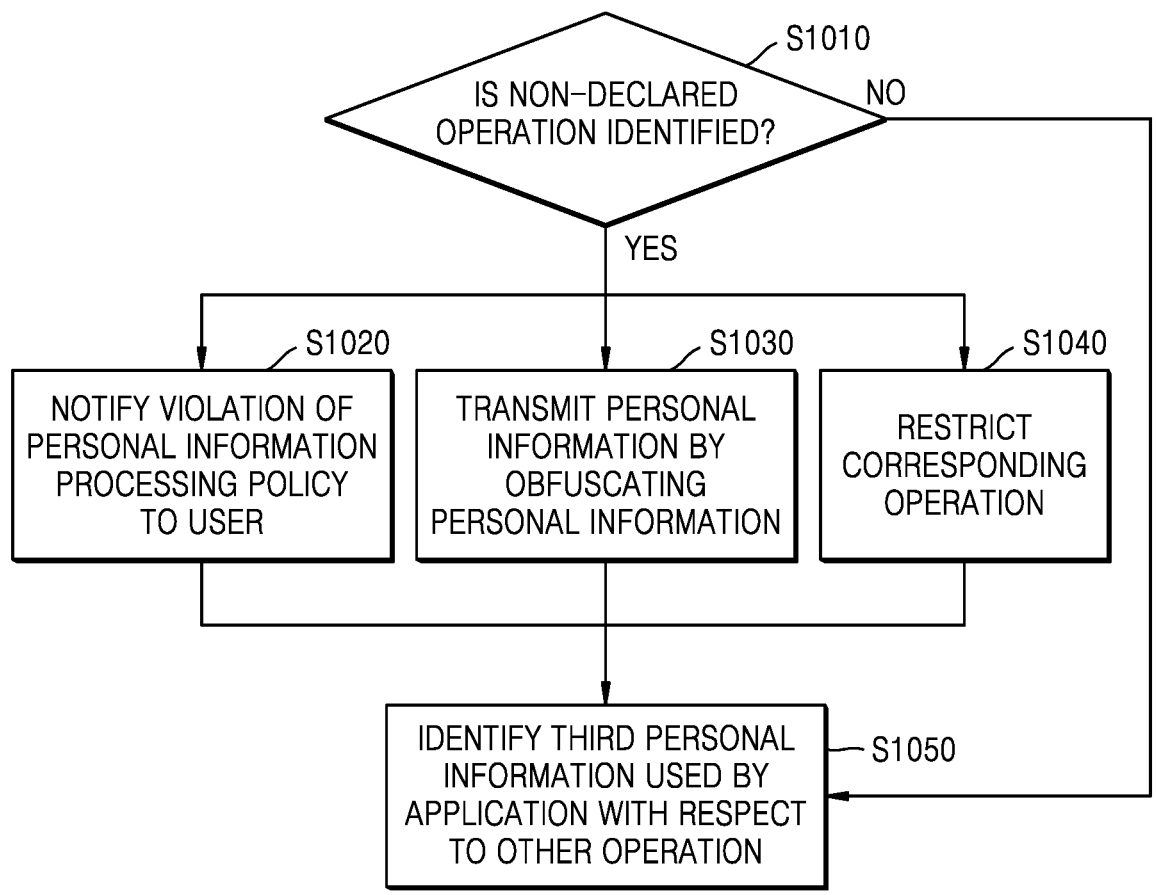
FIG. 10 is a reference diagram for describing an example operation performed by an electronic device to protect user's personal information, according to various embodiments.

FIG. 10 is a reference diagram for describing an example operation performed by an electronic device to protect user's personal data, according to various embodiments.

The electronic device 200 according to an example embodiment may perform operations S1010 to S1050 after operation S350 of FIG. 3.

In operation S1010, the electronic device 200 may identify the third personal information used by the application while the application is executed and operates and may compare at least two of the first, second, and third personal information to identify whether the application performs an operation not described in the privacy policy. The method performed by the electronic device 200 to compare the first, second, and third personal information with each other is described with reference to FIG. 9, and thus, the same description will not be repeated here. When it is identified in operation S1010 that the electronic device 200 performs an operation of collecting or sharing personal data not described in the privacy policy while the application is executed, the electronic device 200 may perform any one or more of operations S1020, S1030, or S1040.

In operation S1020, the electronic device 200 may output notification information notifying that the application being executed violates the personal information processing regulations and provide the notification information to a user. For example, when the identified second personal information or third personal information includes personal data not included in the first personal information, the electronic device 200 may output the notification information with respect to the violation of the privacy policy. In this case, the notification information may be output as an audio signal or a video signal, but is not limited thereto.

In operation S1030, the electronic device 200 may obfuscate the information collected by the executed application. For example, when the identified second personal information or third personal information includes personal data not included in the first personal information, the electronic device 200 may obfuscate the corresponding data. In this case, methods of performing the obfuscation may include various obfuscation methods including conversion of a code of the corresponding data, etc.

In operation S1040, the electronic device 200 may restrict the operation of the executed application. For example, when the identified second personal information or third personal information includes personal data not included in the first personal information, the electronic device 200 may restrict the operation of using the corresponding personal data not included in the first personal information.

The electronic device 200 according to an embodiment may perform operation S1050 after performing any one or more of operations S1020, S1030, or S1040. Also, even when it is identified in operation S1010 that the electronic device 200 normally operates, instead of performing the operation not described in the privacy policy, the electronic device 200 may perform operation S1050 to monitor other operations.

In operation S1050, with respect to the other operations, the electronic device 200 may identify the third personal information used by the application for the other operations and may compare the identified third personal information with the first personal information and the second personal information and identify, with respect to the corresponding operations, whether the personal information processing regulation is violated.

Figure 11:
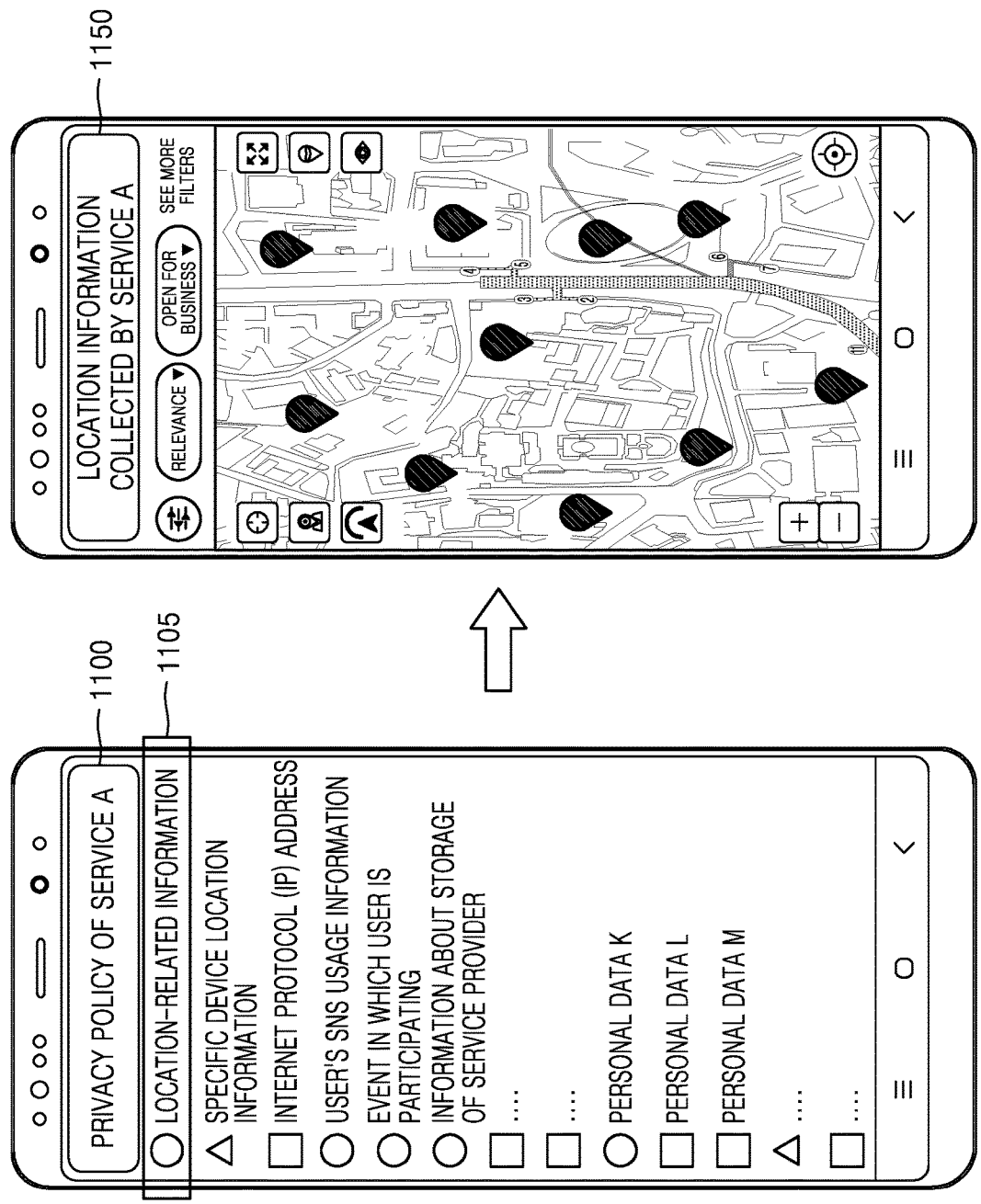
FIG. 11 is a reference diagram for describing an example operation performed by an electronic device to provide, to a user, summary information of a privacy policy, according to various embodiments.

FIG. 11 is a reference diagram for describing an example operation performed by an electronic device to provide, to a user, summary information of a privacy policy, according to various embodiments.

The electronic device 200 according to an embodiment may provide summary information of the privacy policy to the user. For example, the electronic device 200 may generate the summary information using the first personal information identified from the personal data indicating the privacy policy and may provide the generated summary information to the user. In detail, the electronic device 200 may generate the summary information by identifying a predetermined core word, phrase, etc. from the privacy policy. Also, the electronic device 200 may generate the summary information based on a semantic role identified from the privacy policy using an NLU model. The summary information generated by the electronic device 200 may be in the form of an image, a keyword, or a combination thereof, that is, an infographic representation, but is not limited thereto. For example, in the case of an application providing service A, the summary information provided to the user may be provided as "a privacy policy 1100 of service A" as illustrated in FIG. 11. In this case, by using policy data indicating a privacy policy of service A or first personal information identified from the policy data, the electronic device 200 may generate, as the summary information, location-related information 1105, specific device location information, an Internet protocol (IP) address, user's SNS usage information, an event in which the user is participating, information stored by a service provider, etc., which are pieces of personal data collected to provide service A, and may provide the generated summary information to the user.

Also, together with the summary information, the electronic device 200 may provide information about an operation performed with respect to the collected personal data. For example, the personal data collected by the service provider may be displayed by a circular-shaped mark, the personal data shared by the service provider may be displayed by a triangular-shaped mark, and the personal data collected and shared by the service provider may be displayed by a quadrangular-shaped mark.

Also, the electronic device 200 may further provide specific information with respect to each piece of personal data included in the summary information. For example, when the location-related information 1105, which is the personal data included in the summary information, is selected, location information 1150 collected by the service provider to provide the service may be provided as a form mapped to a map.

However, the method of providing the summary information, the method of providing the information about the operation performed with respect to the personal data, and the method of providing the specific information of the personal data are not limited to the methods described above and may include various methods that intuitively provide the information to the user by using an image, a keyword, an infographic, etc.

Figure 12:
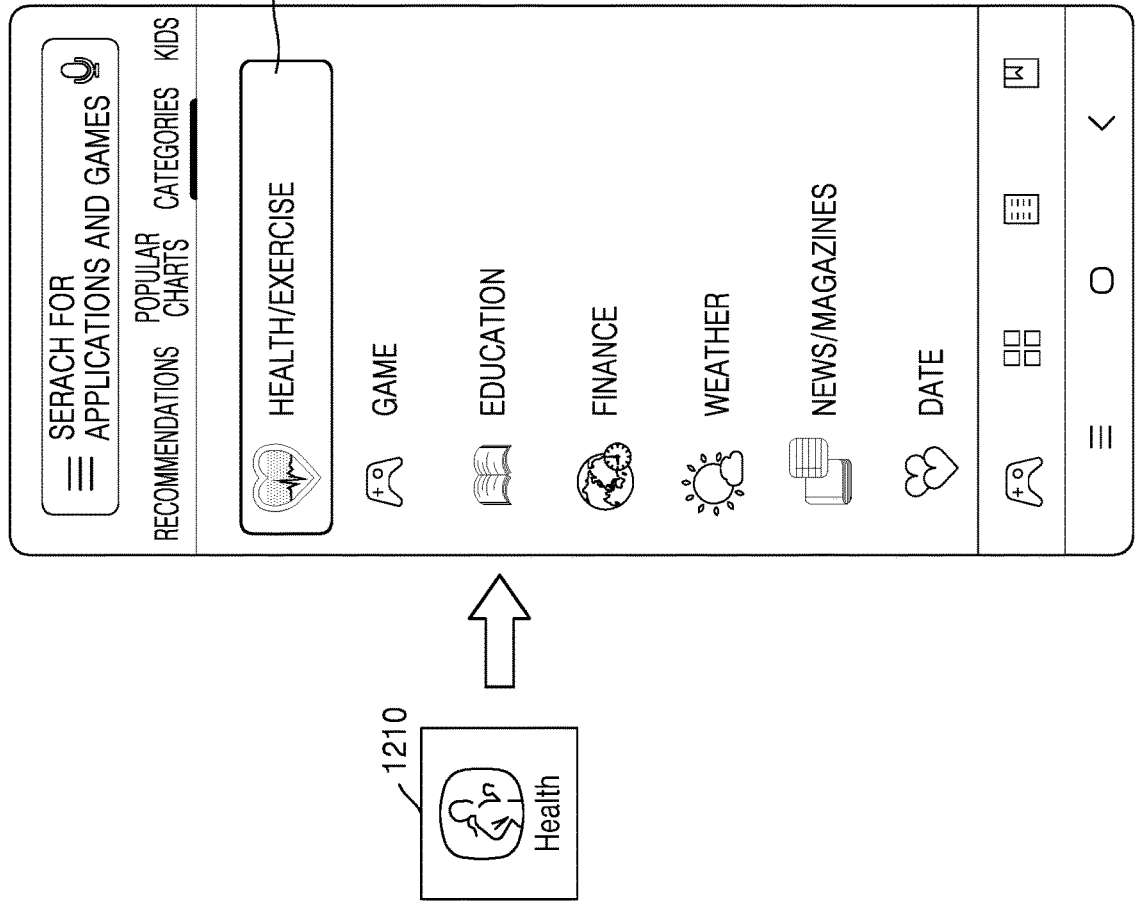
FIG. 12 is a reference diagram for describing an example method, performed by an electronic device, of comparing a privacy policy of an application providing a service with privacy policies of applications included in the same or substantially the same category as the application providing the service, according to various embodiments.

FIG. 12 is a reference diagram for describing an example method, performed by an electronic device, of comparing a privacy policy of an application providing a service with privacy policies of applications included in the same or substantially the same category as the application providing the service, according to various embodiments.

Referring to FIG. 12, the electronic device 200 according to an embodiment may obtain pieces of policy data indicating a privacy policy from applications included in the same or substantially the same category as the application providing the service.

For example, the electronic device 200 according to an embodiment may determine, with respect to a health care application 1210 providing a health care service, a category in which the corresponding application is included. In detail, from among a plurality of application categories, the category of the health care application 1210 may be determined as a health/exercise category 1220. In this case, the electronic device 200 may obtain, from a plurality of applications 1230 included in the health/exercise category, the pieces of policy data indicating the privacy policy.

The electronic device 200 according to an embodiment may use the pieces of policy data indicating the privacy policy, obtained from the plurality of applications 1230, to identify fourth personal information described as being to be used by each application included in the plurality of applications 1230 to provide a service. A method performed by the electronic device 200 to identify the fourth personal information from each of the plurality of applications 1230 is the same as the method of identifying the first personal information described with reference to FIGS. 5 and 6, and thus, the same description will not be repeated here.

The electronic device 200 according to an embodiment may compare the fourth personal information to be used by the plurality of applications 1230 included in the same or substantially the same category, with the first, second, and third personal information. In detail, personal data to be collected or shared on average by the plurality of applications 1230 included in the health/exercise category 1220 to provide a service related to the corresponding category may be identified based on the fourth personal information, and whether the health care application 1210 collects or shares personal data not collected or shared on average by the service included in the health/care category 1220 may be determined.

For example, by comparing the fourth personal information with the first personal information, whether the privacy policy of the health care application 1210 describes collection or sharing of personal data other than the personal data collected or shared on average by the services included in the health/exercise category 1220 may be identified.

As another example, by comparing the fourth personal information with the second personal information, whether the health care application 1210 is programmed to collect or share personal data other than the personal data collected or shared on average by the services included in the health/exercise category 1220 may be identified.

As another example, by comparing the fourth personal information with the third personal information, whether the health care application 1210 performs an operation of collecting or sharing personal data other than the personal data collected or shared on average by the services included in the health/exercise category 1220 while the health care application 1210 is executed may be identified.

The electronic device 200 according to an embodiment may, based on a result of the comparing, identify whether the health care application 1210 collects different information from the application included in the same or substantially the same category, and when it is determined that the health care application 1210 collects unnecessary personal data compared with the applications included in the same or substantially the same category, the electronic device 200 may determine an operation of the electronic device 200 for protecting the user's personal data.

Also, the electronic device 200 according to an embodiment may obtain execution files of the plurality of applications 1230 and perform static analyses on the obtained execution files to identify fifth personal information configured to be used by each application. A method performed by the electronic device 200 to obtain the execution files from the plurality of applications 1230 and identify the fifth personal information is the same as the method of identifying the second personal information described with reference to FIG. 7, and thus, the same description will not be repeated here.

The electronic device 200 according to an embodiment may compare the fifth personal information configured to be used by the plurality of applications 1230 included in the same or substantially the same category with the first, second, and third personal information. In detail, pieces of personal data that the plurality of applications included in the health/exercise category 1220 are programmed to collect or share on average to provide a service may be identified based on the fifth personal information, and whether the health care application 1210 is programmed to collect or share personal data not collected or shared on average by the service included in the health/care category 1220 may be determined.

Figure 13:
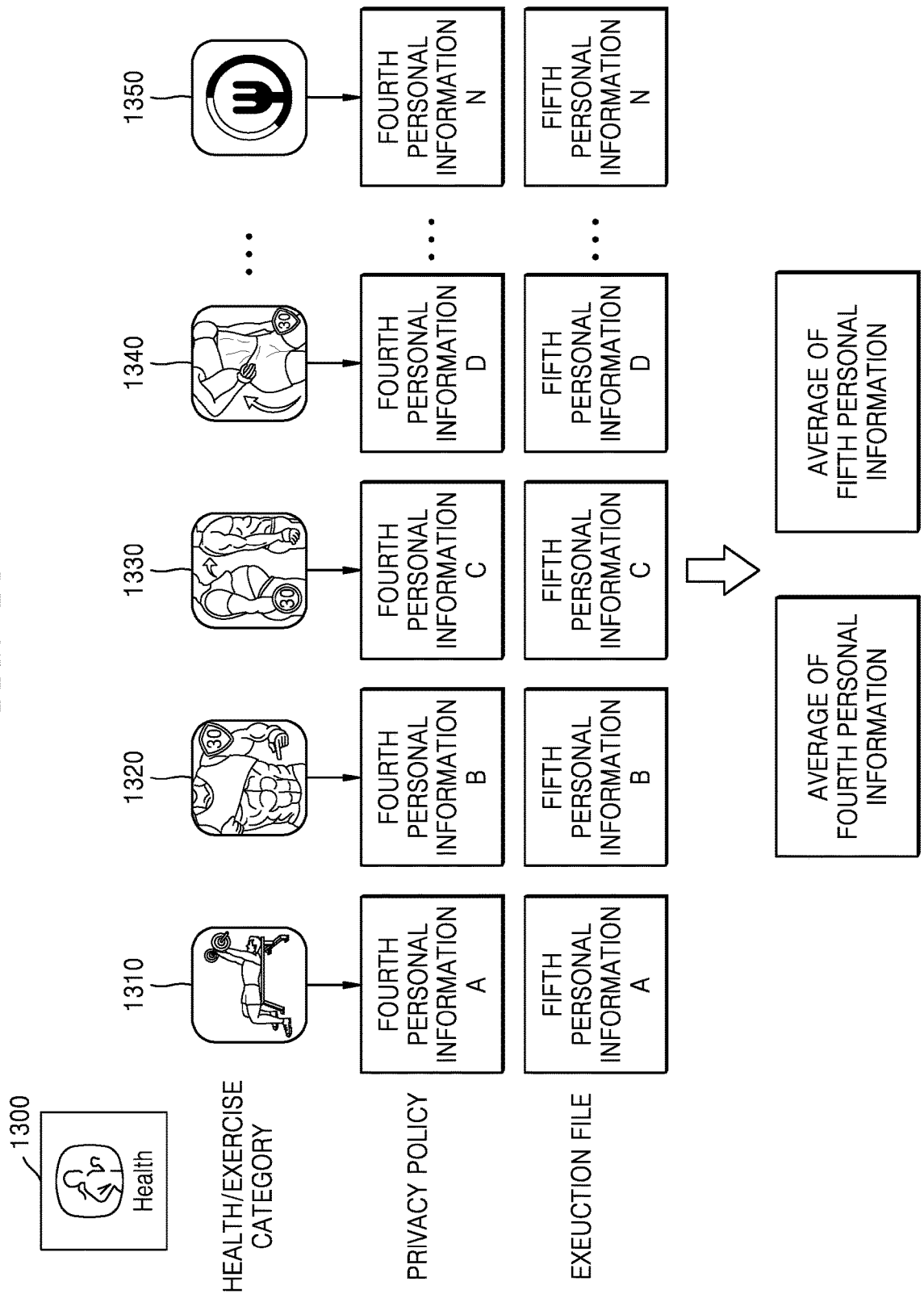
FIG. 13 is a reference diagram for describing an example operation, performed by an electronic device, of identifying fourth personal information and fifth personal information from applications included in the same or substantially the same category, according to various embodiments.

FIG. 13 is a reference diagram for describing an example operation, performed by an electronic device, of identifying fourth personal information and fifth personal information from applications included in the same or substantially the same category, according to various embodiments.

Referring to FIG. 13, based on a frequency by which pieces of personal data included in the fourth personal information and the fifth personal information appear with respect to the plurality of applications, the electronic device 200 according to an embodiment may identify pieces of personal data frequently used on average by services included the same/substantially the same category and may compare the pieces of personal data with personal data included in the first, second, and third personal information. For example, with respect to application A 1310, application B 1320, application C 1330, application D 1340, . . . , and application N 1350 included in the same or substantially the same category as a health care application 1300 providing a health care service, the electronic device 200 may identify fourth personal information A to fourth personal information N. Based on the identified fourth personal information, the electronic device 200 may identify personal data generally collected by the applications included in the same or substantially the same category and pieces of personal data exceptionally collected by the applications included in the same or substantially the same category and may identify whether pieces of personal data included in the first, second, and third personal information correspond to the personal data generally collected or the personal data exceptionally collected, etc. Also, the electronic device 200 may identify fifth personal information A to fifth personal information N. Based on the identified fifth personal information, the electronic device 200 may identify the personal data generally collected and the personal data exceptionally collected by the applications included in the same or substantially the same category as the applications included in the health/exercise category.

FIG. 14 is a diagram for assisting in the understanding of FIGS. 12 and 13 and is a reference flowchart of an example operation, performed by an electronic device, of identifying fourth personal information and fifth personal information from applications included in the same or substantially the same category, and comparing the fourth personal information and the fifth personal information, according to various embodiments.

Although not shown, the electronic device 200 may perform the operation of identifying the first, second, and third personal information of FIG. 3 and the operation of identifying the fourth and fifth personal information of FIG. 14, in a sequential or a parallel way. When the electronic device 200 determines, based on the result of comparing the first, second, and third personal information, the operation for protecting the personal data, the electronic device 200 may determine the operation for protecting the personal data by further using the fourth and fifth personal information.

In operation S1410, the electronic device 200 may obtain pieces of policy data indicating user privacy policies related to a plurality of different services included in the same or substantially the same category as the service provided in the electronic device 200.

In operation S1420, the electronic device 200 may identify, from the obtained pieces of policy data, the fourth personal information, which is used for service provision with respect to each different service. In this case, the obtained pieces of policy data may be URLs of documents in which the privacy policies are described or HTML document files of the privacy policies, but are not limited thereto.

In operation S1430, the electronic device 200 may obtain execution files of applications providing the plurality of different services and may obtain codes of the applications from the obtained execution files, respectively. The execution files may include EXE or APK application program files, but are not limited thereto, and the method of obtaining the code of the application may include, for example, obtaining the code by decompiling the execution file, but is not limited thereto.

In operation S1440, the electronic device 200 may perform a static analysis on the obtained codes and may identify the fifth personal information including information about which personal data of a user the plurality of different applications are programmed to collect or share or to which destination the plurality of different applications are programmed to transmit the user's personal data.

In operation S1450, the electronic device 200 may compare at least one of the first, second, or third personal information with at least one of the fourth or fifth personal information. Via this operation, with respect to the method, performed by the electronic device 200, of protecting the user's personal data by comparing the first, second, and third personal information, the electronic device 200 may further use at least one of the fourth or fifth personal information to determine whether the application providing the service in the electronic device 200 collects or shares personal data other than the personal data collected or shared on average by the other applications.

In operation S1460, the electronic device 200 may determine, based on a result of the comparing in operation S1450, the operation of the electronic device 200 for protecting the user's personal information. The operation of the electronic device 200 is described with reference to FIG. 10, and thus, the same description is not repeated here.

The method, performed by the electronic device 200, of analyzing the privacy policy, according to an embodiment, may be implemented as a program command which may be executed by various computer devices and may be recorded on a computer-readable medium. The computer-readable medium may separately include each of a program command, a data file, a data structure, etc. or may include a combination thereof. The program command recorded on the computer-readable medium may be specially designed and constructed for the disclosure or may be known to and usable by one of ordinary skill in the field of computer software. Examples of the computer-readable recording medium include magnetic media, such as hard discs, floppy discs, and magnetic tapes, optical media, such as compact disc-read only memories (CD-ROMs) and digital versatile discs (DVDs), magneto-optical media, such as floptical discs, and hardware devices specially configured to store and execute program commands, such as ROMs, RAMs, and flash memories. Examples of the program command include advanced language codes that may be executed by a computer by using an interpreter or the like as well as machine language codes made by a compiler.

Also, the method of protecting personal information according to the disclosed embodiments may be included in a computer program product. The computer program product may be transacted between a seller and a purchaser, as a product.

The computer program product may include a software (S/W) program or a computer-readable storage medium in which the S/W program is stored. For example, the computer program product may include a product in the form of an S/W program (for example, a downloadable application) that is electronically distributed through a manufacturer of the electronic device 200 or an electronic market (for example, a Google play store or an App store). For electronic distribution, at least a portion of the S/W program may be stored in a storage medium or temporarily generated. In this case, the storage medium may include a server of a manufacturer, a server of an electronic market, or a storage medium of a broadcasting server temporarily storing the software program.

In a system including a server and a client device, the computer program product may include a storage medium of the server or a storage medium of the client device. Alternatively, when there is a third device (for example, a smartphone) connected to the server or the client device for communication, the computer program product may include a storage medium of the third device. Alternatively, the computer program product may directly include an S/W program transmitted from the server to the client device or the third device or transmitted from the third device to the client device.

In this case, any one of the server, the client device, and the third device may perform the method according to the embodiments by executing the computer program product. Alternatively, at least two of the server, the client device, and the third device may perform the method according to the embodiments by executing the computer program product in a distributed fashion.

For example, the server (for example, a cloud server or an AI server) may execute a computer program product stored in the server to control the client device connected to the server for communication to perform the method according to the embodiments.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method, performed by an electronic device, of protecting a user's personal data related to an application, the method comprising:
    obtaining policy data indicating a user privacy policy related to a service provided by the electronic device;
    identifying, from the obtained policy data, first personal information including first personal data elements to be used to provide the service;
    identifying second personal information including second personal data elements, configured to be used by the application by performing static analysis on code of the application obtained from an execution file of the application;
    identifying third personal information including third personal data elements used by the application, by performing dynamic analysis while the application is executing;
    comparing the first personal information, the second personal information and the third personal information to identify personal data element that is not corresponding;
    determining, based on a result of the comparing, an operation of the electronic device for protecting the user's personal data; and
    performing the determined operation.

2. The method of claim 1, wherein the determining of the operation of the electronic device includes, based on the second personal information or the third personal information including personal data not included in the first personal information, outputting notification information notifying that the application violates the user privacy policy.

3. The method of claim 1, wherein the determining of the operation of the electronic device includes, based on the second personal information or the third personal information including personal data not included in the first personal information, obfuscating the personal data included in the second personal information or the third personal information and not included in the first personal information.

4. The method of claim 1, wherein the determining of the operation of the electronic device includes, based on the second personal information or the third personal information including personal data not included in the first personal information, restricting an operation, performed by the application, of using the personal data included in the second personal information or the third personal information and not included in the first personal information.

5. The method of claim 1, wherein the identifying of the first personal information includes identifying the first personal information, based on data output by applying the obtained policy data to a natural language understanding (NLU) model performing semantic role labeling.

6. The method of claim 1, further comprising:
determining a category of the service;
obtaining a plurality of pieces of policy data indicating user privacy policies related to a plurality of different services included in a same category as the determined service category; and
identifying, from each of the plurality of pieces of policy data, fourth personal information to be used to provide each of the plurality of different services,
wherein the comparing includes comparing the first personal information, the second personal information, the third personal information, and the fourth personal information.

7. The method of claim 6, further comprising identifying, from each of execution files of a plurality of different applications respectively providing the plurality of different services, fifth personal information configured to be used by the plurality of different applications,
wherein the comparing includes comparing the first personal information, the second personal information, the third personal information, the fourth personal information, and the fifth personal information.

8. An electronic device for protecting a user's personal data related to an application, the electronic device comprising:
a communicator including communication circuitry;
an output unit including output circuitry;
memory storing one or more instructions; and
at least one processor, comprising processing circuitry, configured to execute the one or more instructions stored in the memory to:
obtain policy data indicating a user privacy policy related to a service provided by the electronic device,
identify, from the obtained policy data, first personal information including first personal data elements to be used to provide the service,
identify second personal information including second personal data elements, configured to be used by the application by performing static analysis on code of the application obtained from an execution file of the application,
identify third personal information including third personal data elements used by the application, by performing dynamic analysis while the application is executing,
compare the first personal information, the second personal information and the third personal information to identify personal data element that is not corresponding,
determine, based on a result of the comparing, an operation of the electronic device for protecting the user's personal data, and
perform the determined operation.

9. The electronic device of claim 8, wherein the at least one processor is configured to execute the one or more instructions to, based on the second personal information or the third personal information including personal data not included in the first personal information, control to output notification information notifying that the application violates the user privacy policy.

10. The electronic device of claim 8, wherein the at least one processor is configured to execute the one or more instructions to, based on the second personal information or the third personal information including personal data not included in the first personal information, obfuscate the personal data included in the second personal information or the third personal information and not included in the first personal information.

11. The electronic device of claim 8, wherein the at least one processor is configured to execute the one or more instructions to, based on the second personal information or the third personal information including personal data not included in the first personal information, restrict an operation, performed by the application, of using the personal data included in the second personal information or the third personal information and not included in the first personal information.

12. The electronic device of claim 8, wherein the at least one processor is further configured to execute the one or more instructions to identify the first personal information, based on data output by applying the obtained policy data to a natural language understanding (NLU) model performing semantic role labeling.

13. The electronic device of claim 8, wherein the at least one processor is configured to execute the one or more instructions to:
determine a category of the service,
obtain a plurality of pieces of policy data indicating user privacy policies related to a plurality of different services included in a same category as the determined service category,
identify, from each of the plurality of pieces of policy data, fourth personal information to be used to provide each of the plurality of different services, and
compare the first personal information, the second personal information, the third personal information, and the fourth personal information.

14. The electronic device of claim 13, wherein the at least one processor is further to execute the one or more instructions to:
identify, from each of execution files of a plurality of different applications respectively providing the plurality of different services, fifth personal information configured to be used by the plurality of different applications, and
compare the first personal information, the second personal information, the third personal information, the fourth personal information, and the fifth personal information.

15. A non-transitory computer-readable recording medium having recorded thereon a program for protecting a user's personal data related to an application, the program, when executed, causing an electronic device to perform operations comprising:

obtaining policy data indicating a user privacy policy related to a service provided by the electronic device;

identifying, from the obtained policy data, first personal information including first personal data elements to be used to provide the service;

identifying second personal information including second personal data elements, configured to be used by the application by performing static analysis on code of the application obtained from an execution file of the application;

identifying third personal information including third personal data elements used by the application, by performing dynamic analysis while the application is executing;

comparing the first personal information, the second personal information and the third personal information to identify personal data element that is not corresponding;

determining, based on a result of the comparing, an operation of the electronic device for protecting the user's personal data; and performing the determined operation.

* * * * *